US012690665B2

(12) United States Patent
Okai et al.

(10) Patent No.: US 12,690,665 B2
(45) Date of Patent: Jul. 28, 2026

(54) ORAL CARE SYSTEM INCLUDING ORAL CARE IMPLEMENT WITH MOTION TRACKING FEATURES

(71) Applicant: Colgate-Palmolive Company, New York, NY (US)

(72) Inventors: Takahide Okai, Highland Park, NJ (US); Vincent El Kouby-Benichou, Montreuil (FR); Olivier Giroud, Courbevoie (FR); Yanmei Ji, Jiangsu (CN); Fan Gang Xie, Shanghai (CN)

(73) Assignee: Colgate-Palmolive Company, New York, NY (US)

( * ) Notice: Subject to any disclaimer, the term of this patent is extended or adjusted under 35 U.S.C. 154(b) by 734 days.

(21) Appl. No.: 18/074,804

(22) Filed: Dec. 5, 2022

(65) Prior Publication Data

US 2023/0180924 A1     Jun. 15, 2023

Related U.S. Application Data

(60) Provisional application No. 63/288,740, filed on Dec. 13, 2021.

(51) Int. Cl.
*A46B 15/00* (2006.01)
*A61C 17/22* (2006.01)

(52) U.S. Cl.
CPC ........ *A46B 15/0006* (2013.01); *A61C 17/225* (2013.01)

(58) Field of Classification Search
CPC ............ A46B 15/0006; A46B 15/0002; A46B 15/0085; A61C 17/225; G06T 2207/30036; G06T 7/20
(Continued)

(56) References Cited

U.S. PATENT DOCUMENTS 9,586,135 B1    3/2017   Capper et al.
9,642,684 B2    5/2017   Yoshida et al.
(Continued)

FOREIGN PATENT DOCUMENTS

WO      2016/020803      2/2016
WO      2017/029469      2/2017
WO      2017/117120      7/2017

OTHER PUBLICATIONS

Flagg, A. et al., "An Intelligent Toothbrush: Machines for Smart Brushing," Intelligent Assistive Technology and Systems Lab Department of Occupational Science and Occupational Therapy, University of Toronto, [no date provided], retrieved Oct. 15, 2021, pp. 1-4.
(Continued)

*Primary Examiner* — Monica S Carter
*Assistant Examiner* — Caleb Andrew Holizna

(57)     ABSTRACT

An oral care system includes an oral care implement and motion tracking attachment configured to allow tracking of the implement during an oral care activity such as tooth brushing. The oral care implement may include a handle and head. The tracking attachment is coupled to the implement and comprises colored tracking markers detectable by a programmable visual-based motion tracking unit. The tracking attachment in one configuration may comprise a housing with plural insertable tracking colored wedges. In another configuration, a colored tracking portion colored panels and optional colored neck band may be formed on or attached to the oral care implement. Both the tracking attachment and tracking portion embodiments as applicable facilitate tracking at least one of a position, orientation, movement, and the like of the oral care implement to which it is attached. The tracking attachment may be non-electric in nature without any onboard electronics in some embodiments.

19 Claims, 23 Drawing Sheets

(58) Field of Classification Search
USPC .......................................... 15/167.1; 40/314
See application file for complete search history.

(56) References Cited

U.S. PATENT DOCUMENTS

| | | | |
|---|---|---|---|
| 9,750,586 | B2 | 9/2017 | Hwang et al. |
| 10,799,155 | B2 | 10/2020 | El Kouby-Benichou et al. |
| 10,925,387 | B2 | 2/2021 | Nishiura et al. |
| 11,006,862 | B2 | 5/2021 | El Kouby-Benichou et al. |
| 2009/0215015 | A1 | 8/2009 | Chu |
| 2014/0116463 | A1* | 5/2014 | Edelstein ............... G06Q 99/00 |
| | | | 206/362.1 |
| 2018/0132602 | A1 | 5/2018 | Gatzemeyer |
| 2020/0037748 | A1* | 2/2020 | Gatzemeyer ......... A61C 17/225 |
| 2024/0087142 | A1* | 3/2024 | Almaev ................. G06V 10/56 |

OTHER PUBLICATIONS

Marcon, M. et al., "Toothbrush motion analysis to help children learn proper tooth brushing," Elsevier, Computer Vision and Image Understanding, 148, (2016), pp. 34-45.
International Search Report and the Written Opinion of the International Searching Authority issued in International Application PCT/US2022/051793 mailed Mar. 10, 2023.

* cited by examiner

108

111

110

111a

111b

107

9B

ORAL CARE SYSTEM INCLUDING ORAL CARE IMPLEMENT WITH MOTION TRACKING FEATURES

CROSS-REFERENCE TO RELATED APPLICATIONS

The present application claims priority to U.S. Provisional Patent Application Ser. No. 63/288,740, filed Dec. 13, 2021, the entirety of which is incorporated herein by reference.

BACKGROUND

The present disclosure is related to oral care systems, and more particularly to such systems including an oral care implement with visually-detectable motion tracking features.

In the oral care field, various systems exist for tracking the user's movement, position, and angular orientation of an oral care implement such as a toothbrush when brushing one's teeth. Many users have a desire to obtain information measuring the effectiveness of their oral care regimen including using proper brushing techniques to satisfactorily clean the teeth. Visual-based electronic motion detection systems controlled by a programmable processor can detect and track toothbrush motions, and then compare such real-time motions to preprogrammed calibration data associated with proper brushing techniques. The system can then use this comparison to provide feedback to the user in real-time so that the user can adjust their brushing technique accordingly to achieve optimum brushing effectiveness.

In this regard, expensive electronic-based oral care implements such as toothbrushes have been developed which allow tracking the brushing motions of the user. However, there is a need to improve these motion tracking devices aesthetically, functionally, and from an affordability standpoint. For example, some of these oral care implements may alter the normal streamlined contours of a conventional manual or electric toothbrush resulting in a somewhat bulky electronic tracking toothbrush which lacks the aesthetics and comfortable handling of conventional toothbrushes preferred by some users.

Accordingly, a continuing need exists for improvements in motion-trackable oral care implements.

BRIEF SUMMARY

The present disclosure provides an oral care system that includes an oral care implement with visually-detectable motion tracking features which overcomes some of the drawbacks of the foregoing prior bulky and expensive electronic tracking oral care implements. In non-limiting embodiments, an oral care implement in the form of a toothbrush is disclosed which includes brushing motion tracking features that advantageously preserve the smooth and streamlined contours of a conventional manual or electric toothbrush appealing to many users. The tracking features, which may be multi-colored tracking indicia or markers in one embodiment, are configured and arranged to be detectable by electronic visual motion detection systems under control of a programmable processor coupled with a digital tracking camera. Such motion detecting and tracking system usable with the present manual toothbrush with tracking feature include those disclosed in commonly-owned U.S. Pat. Nos. 10,799,155 and 11,006,862; which are incorporated herein by reference.

In one embodiment, the visually-detectable tracking features comprising the multi-colored tracking indicia or markers may be embodied in a tracking attachment which is removably or permanently coupled to the toothbrush, as further described herein. The present disclosure further provides an associated method or process for assembling a motion tracking attachment to the oral care implement such as a toothbrush.

In one aspect, an oral care implement with motion tracking features comprises: an elongated body defining a longitudinal axis and comprising a handle defining a proximal end, a head defining a distal end, and a neck connecting the handle to the head; a tracking attachment coupled to the handle and comprising a plurality of colored tracking markers, the tracking markers configured to facilitate tracking motion of the oral care implement by a user; wherein the tracking attachment protrudes transversely outwards relative to the longitudinal axis no farther than the handle. Thought of in another way, the tracking attachment does not protrude transversely outwards relative to the longitudinal axis beyond the handle. The colored tracking markers includes at least two different colors, and in one embodiment may be wedge shaped.

According to another aspect, a method for assembling an oral care implement with tracking features comprises: providing an outwardly open receptacle in the oral care implement; and inserting a tracking attachment into the receptacle; the tracking attachment including a plurality of colored tracking markers visible after the tracking attachment is inserted into the receptacle. The colored tracking markers may comprise a plurality of colored inserts disposed in the housing, the inserts each having a wedge shape and including at least two different colors. The method may further comprise initially selecting a set of the colored inserts from a plurality of the colored inserts, and mounting the selected set of colored inserts in an outwardly open receiving cavity of the housing.

According to another aspect, an oral care implement with motion tracking features comprises: an elongated body defining a longitudinal axis and comprising a handle defining a proximal end, a head defining a distal end, and a neck connecting the handle to the head; a tracking portion disposed on the handle, the tracking portion including a plurality of colored tracking markers, the tracking markers configured to facilitate tracking motion of the oral care implement by a user; wherein the tracking portion protrudes transversely outwards relative to the longitudinal axis no farther than the handle. The colored tracking markers may include at least two different colors. In some embodiments, the oral care implement may further comprise a multi-colored neck band disposed between the proximal and distal ends of the body of the oral care implement. The neck band extends circumferentially around the body and comprises multi-colored arc segments.

Further areas of applicability of the present invention will become apparent from the detailed description provided hereinafter. It should be understood that the detailed description and specific examples, while indicating some preferred but non-limiting embodiments of the invention, are intended for purposes of illustration only and not a limitation of the scope and applicability of the invention.

BRIEF DESCRIPTION OF THE DRAWINGS

The present invention will become more fully understood from the detailed description and the accompanying drawings, wherein like elements are labeled similarly and in which.

Figure 1:
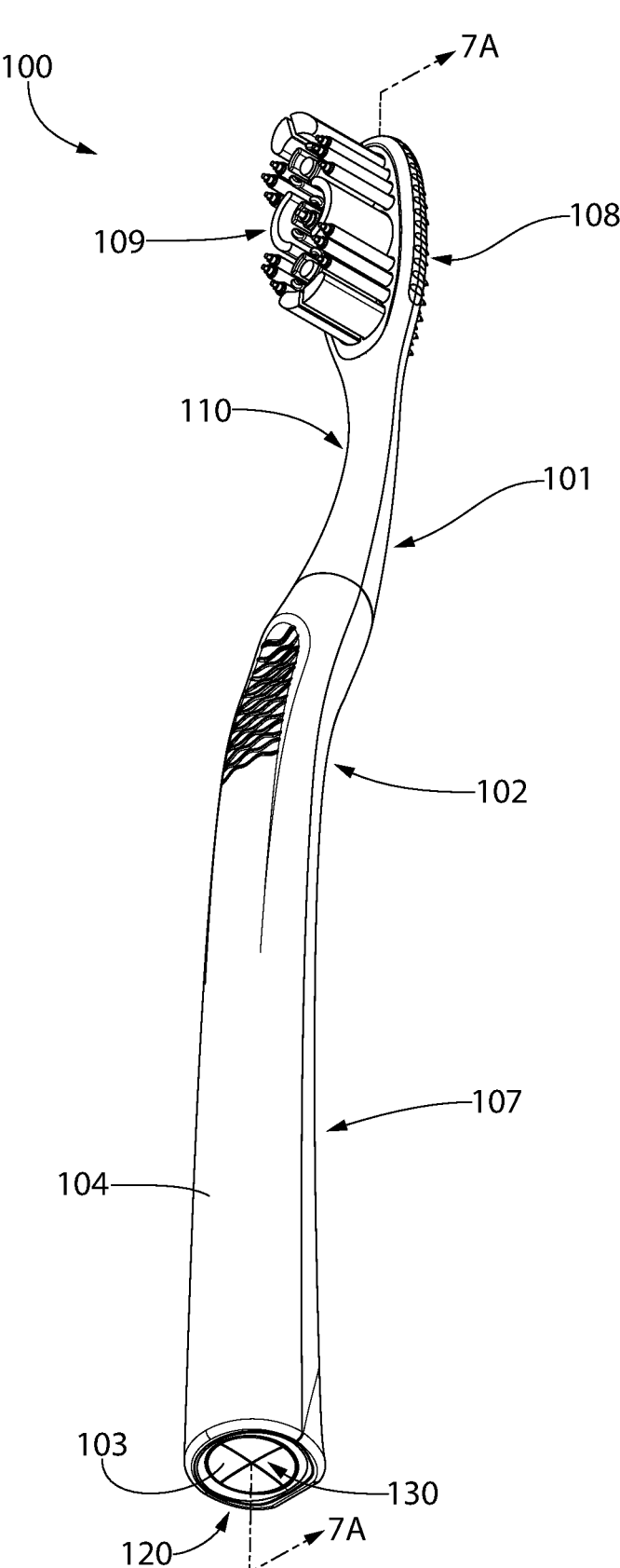
FIG. 1 is a front perspective view of an oral care system including an oral care implement with motion tracking attachment coupled thereto in accordance with an embodiment according to the present disclosure.
Figure 2:
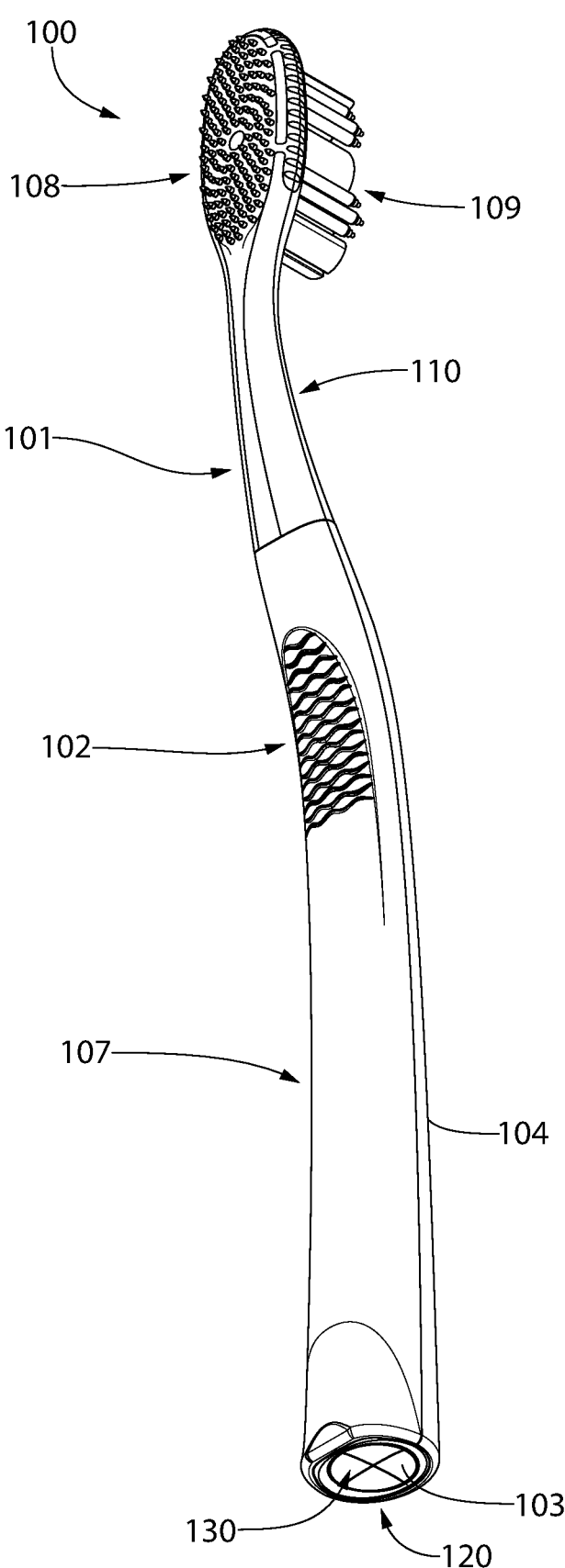
FIG. 2 is a rear perspective view thereof.
Figure 3:
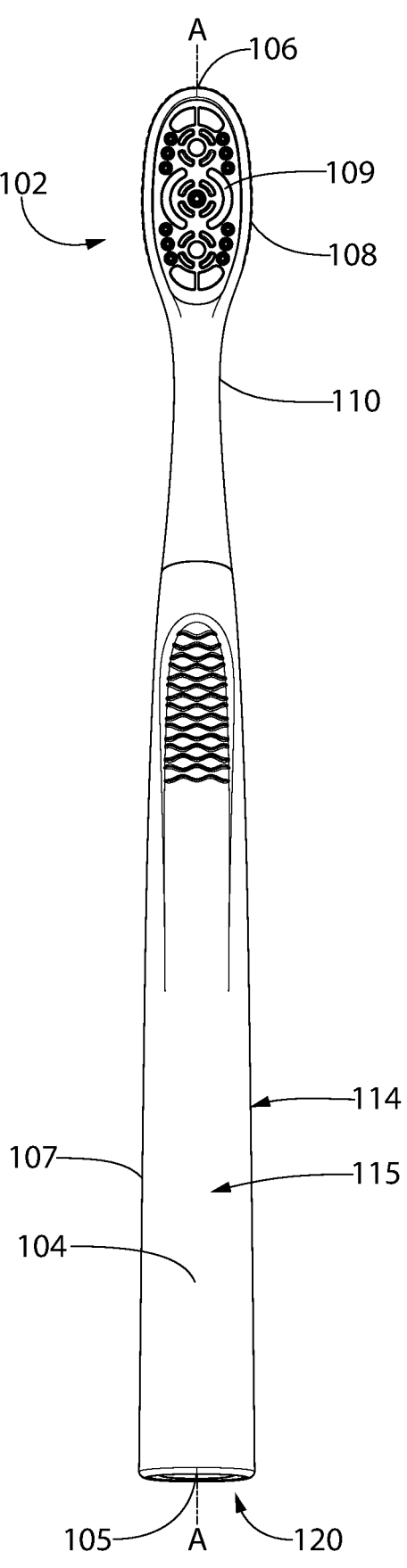
FIG. 3 is a front view thereof.
Figure 4:
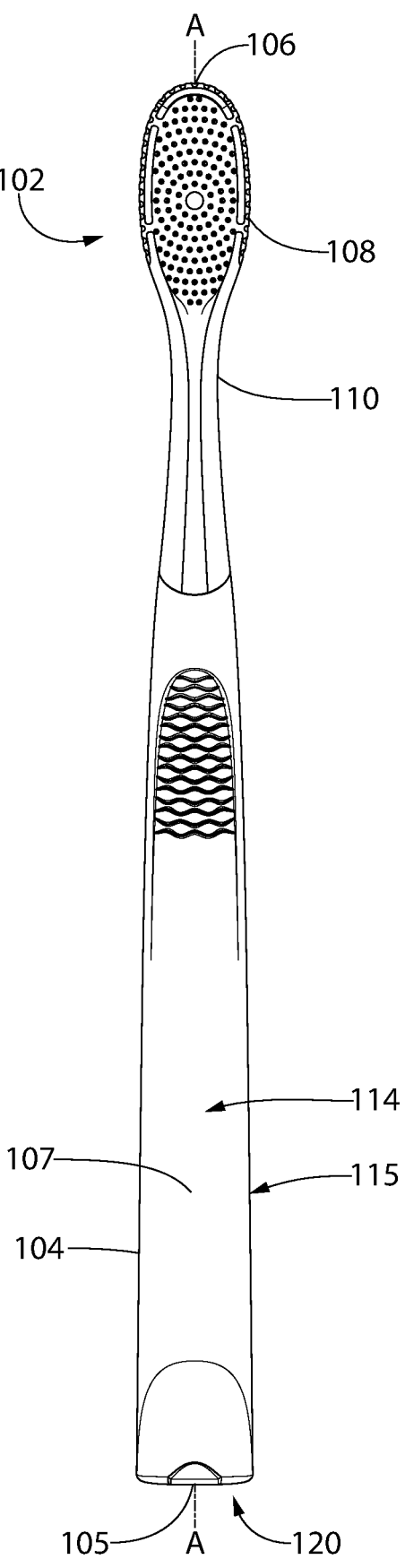
FIG. 4 is a rear view thereof.
Figure 5:
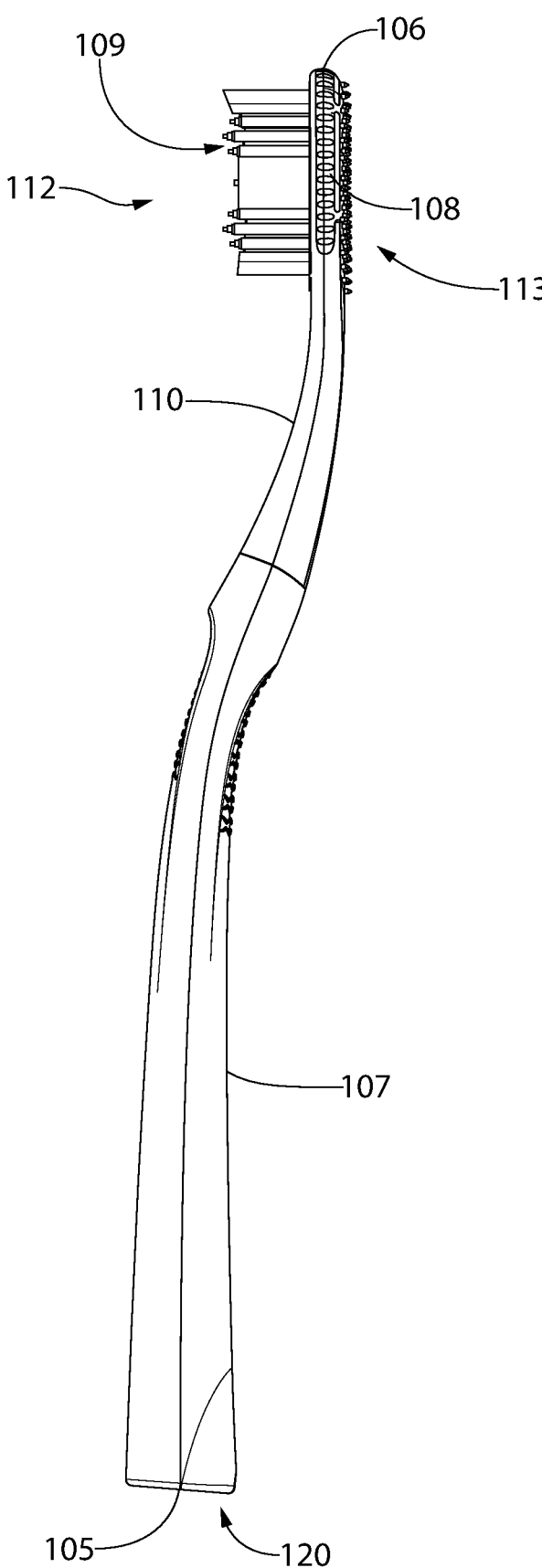
FIG. 5 is a lateral side view thereof.
Figure 6:
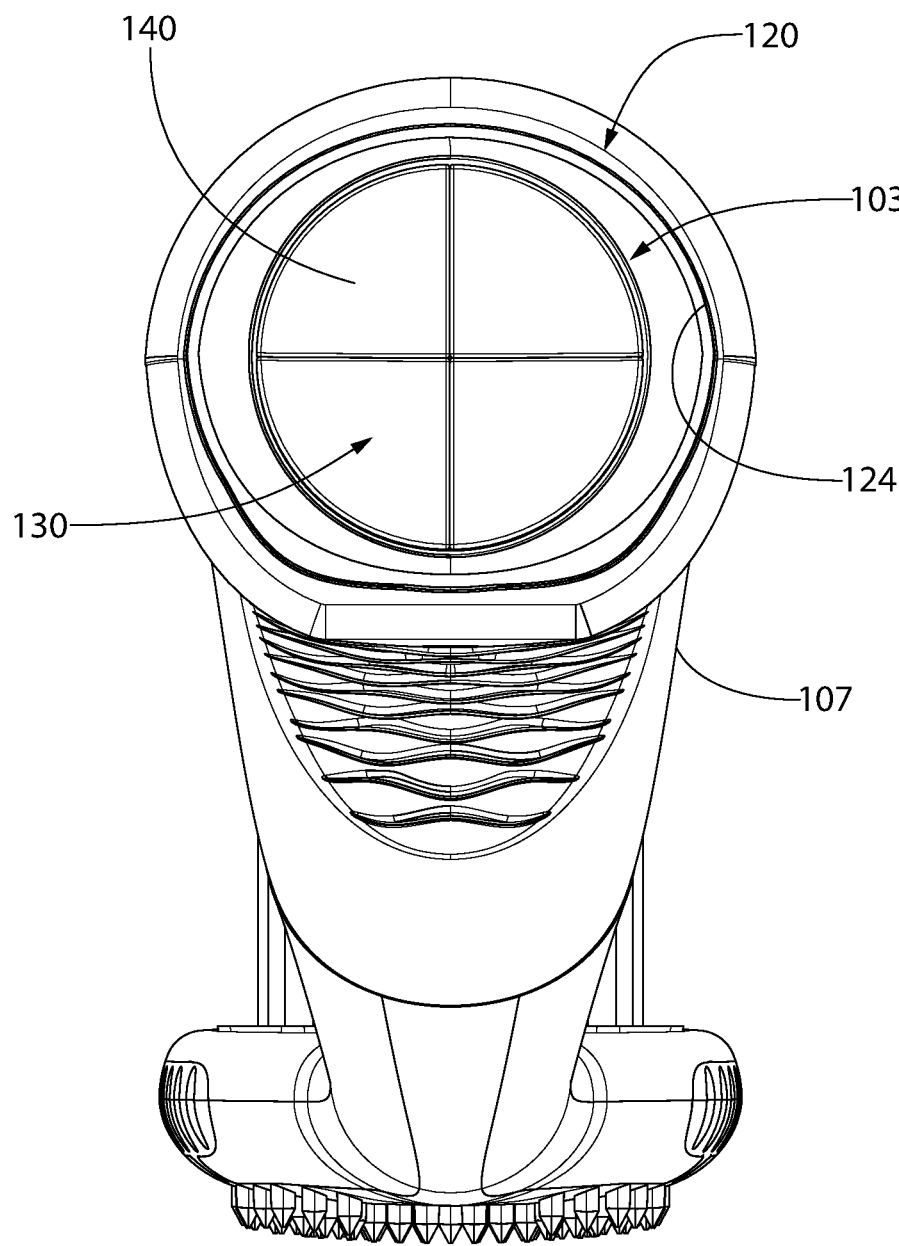
FIG. 6 is a proximal end view thereof.
Figure 7A:
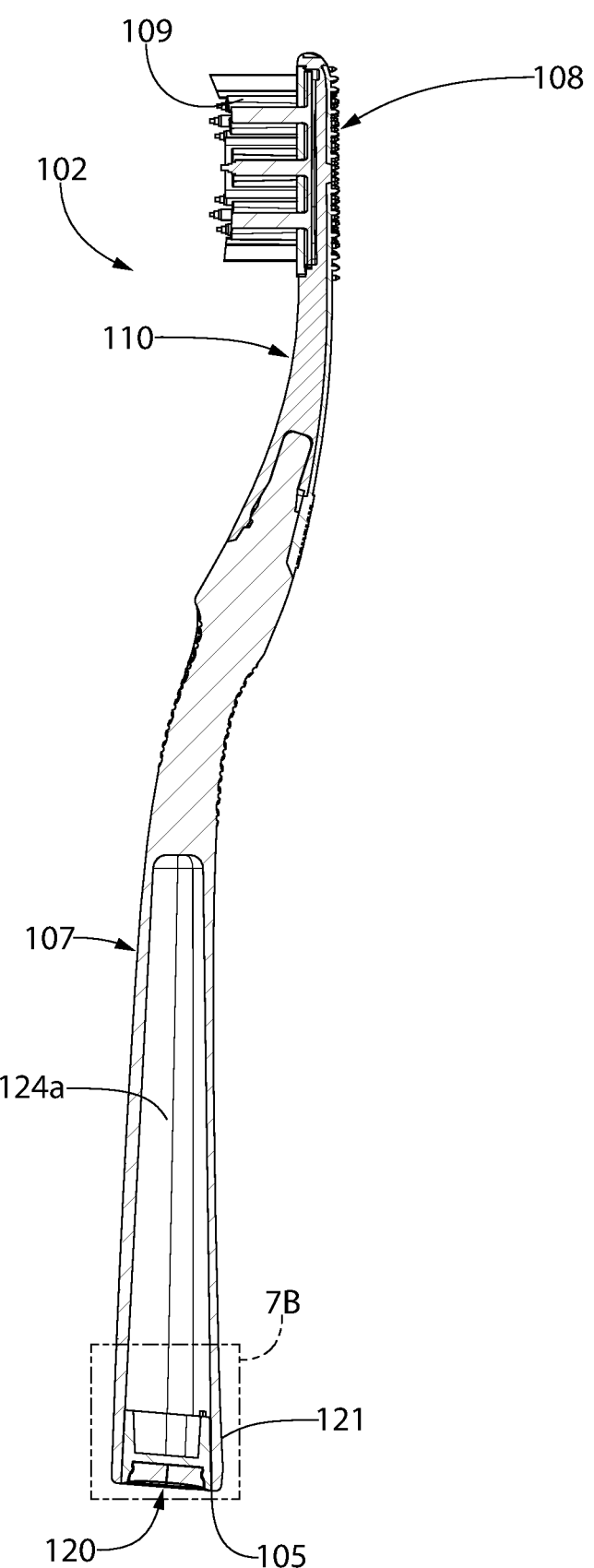
FIG. 7A is a side cross-sectional view thereof.
Figure 7B:
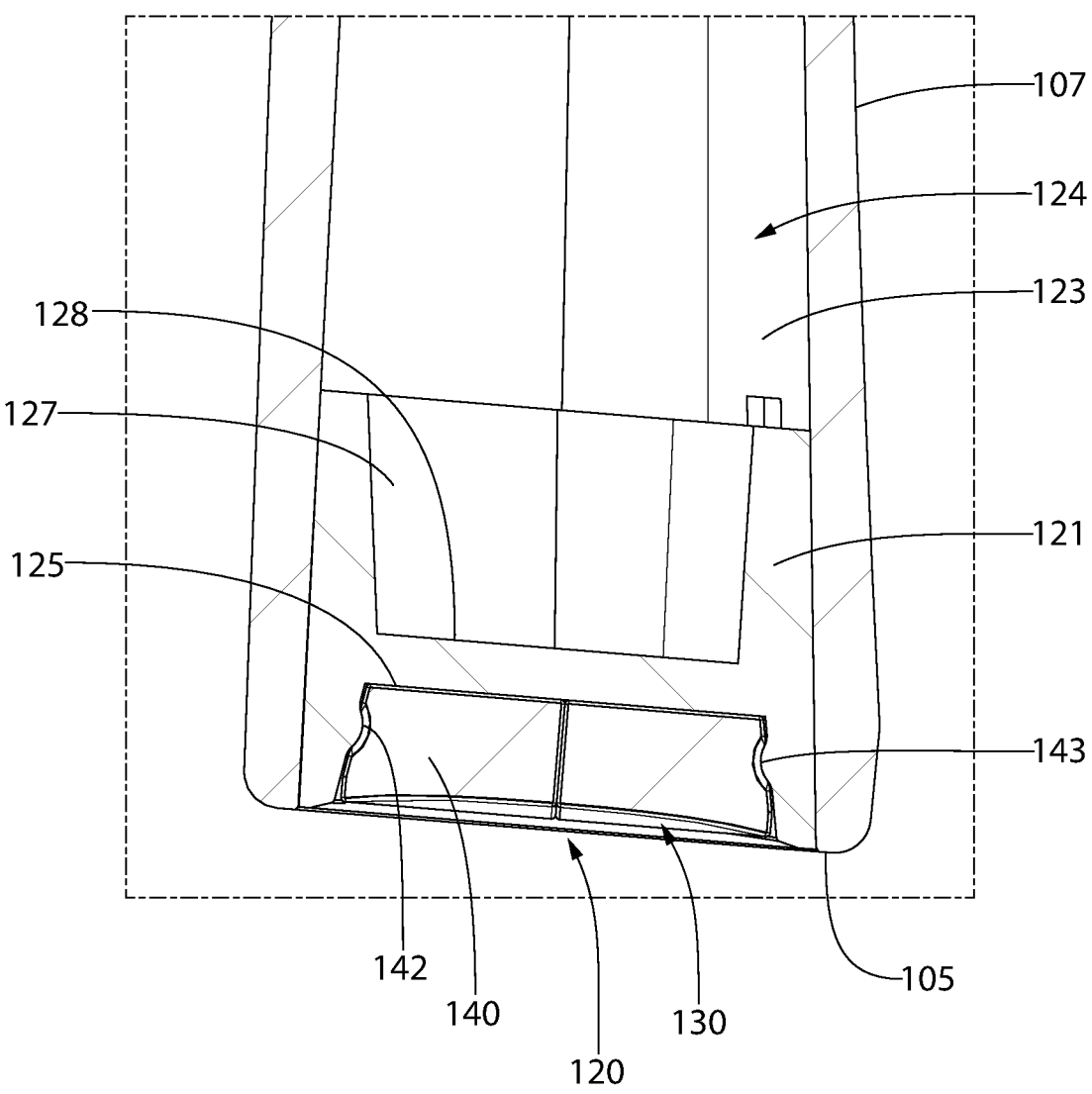
FIG. 7B is an enlarged detail from FIG. 7A.
Figure 8A:
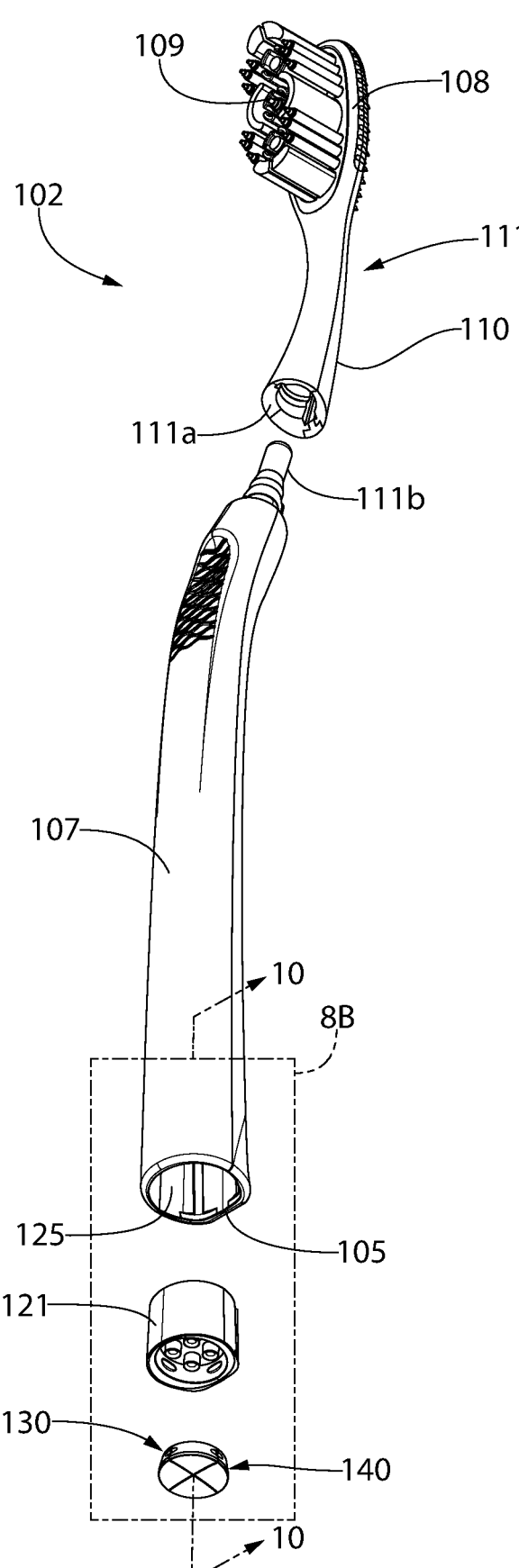
FIG. 8A is a front exploded perspective view of the oral care implement of FIG. 1.
Figure 8B:
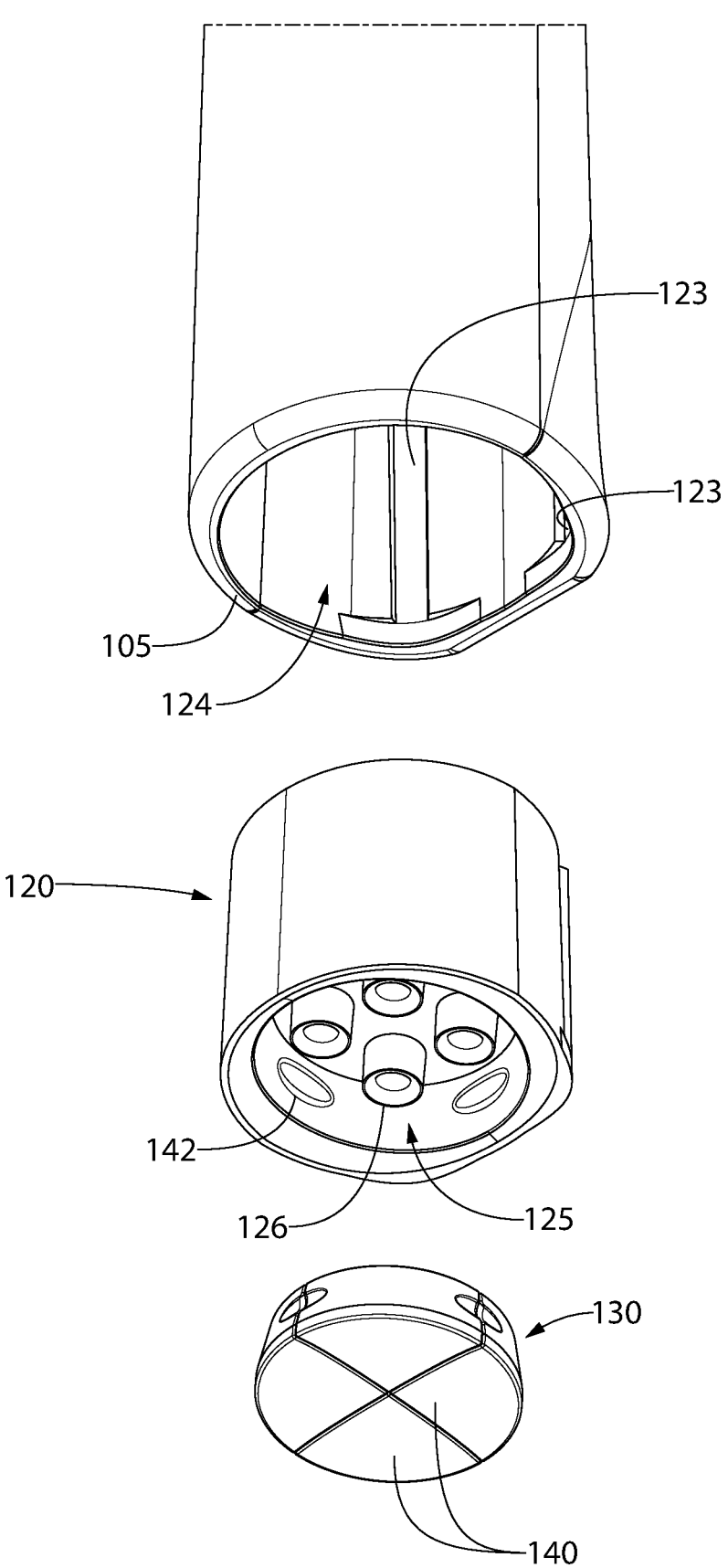
FIG. 8B is an enlarged detail from FIG. 8A.
Figure 9A:
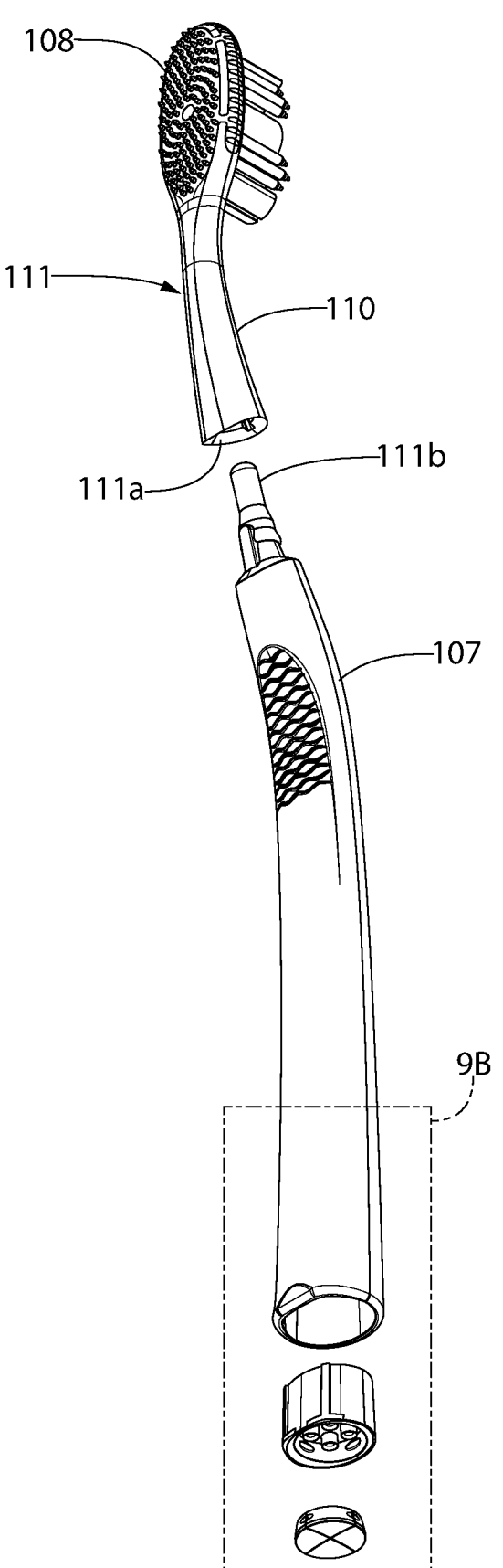
FIG. 9A is a rear exploded perspective view of the oral care implement of FIG. 1.
Figure 9B:
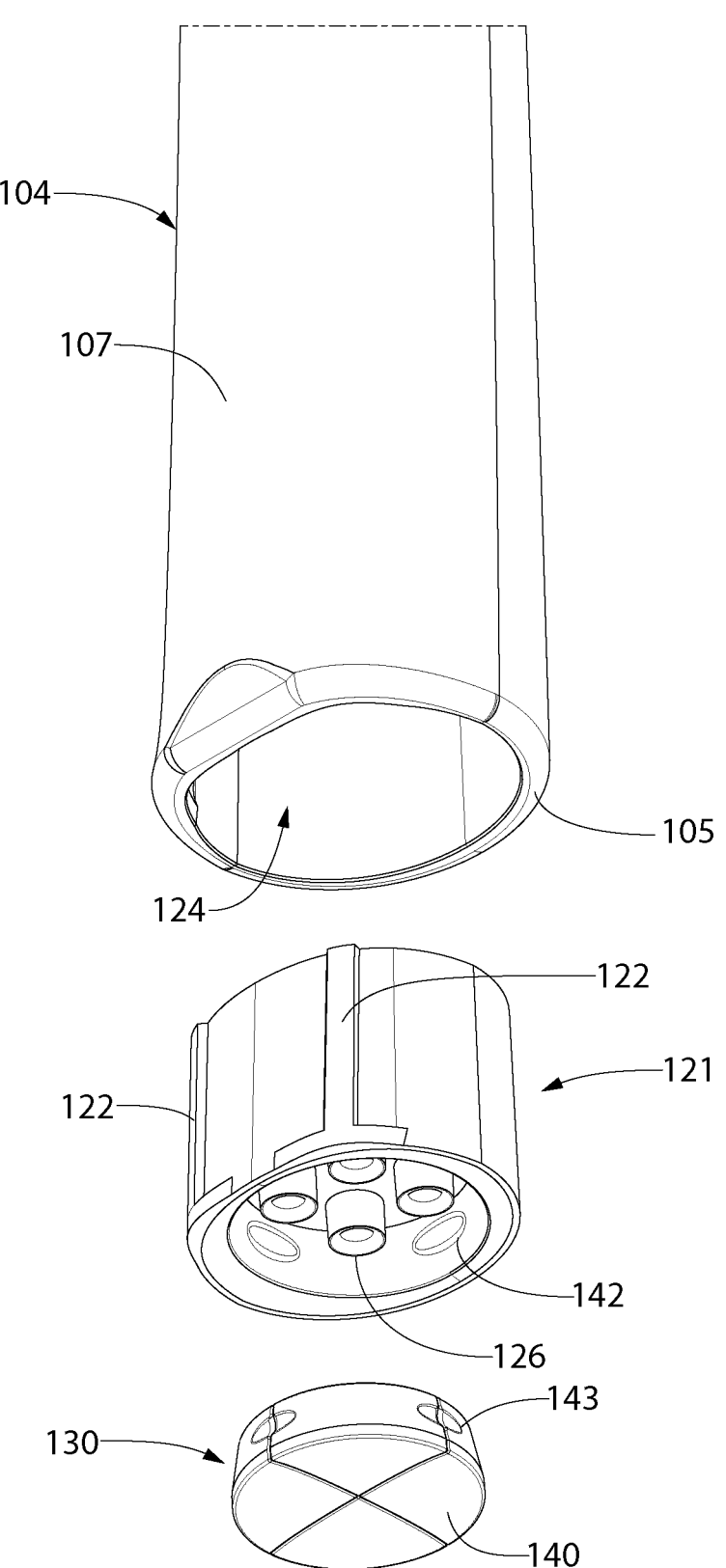
FIG. 9B is an enlarged detail from FIG. 9A.
Figure 10:
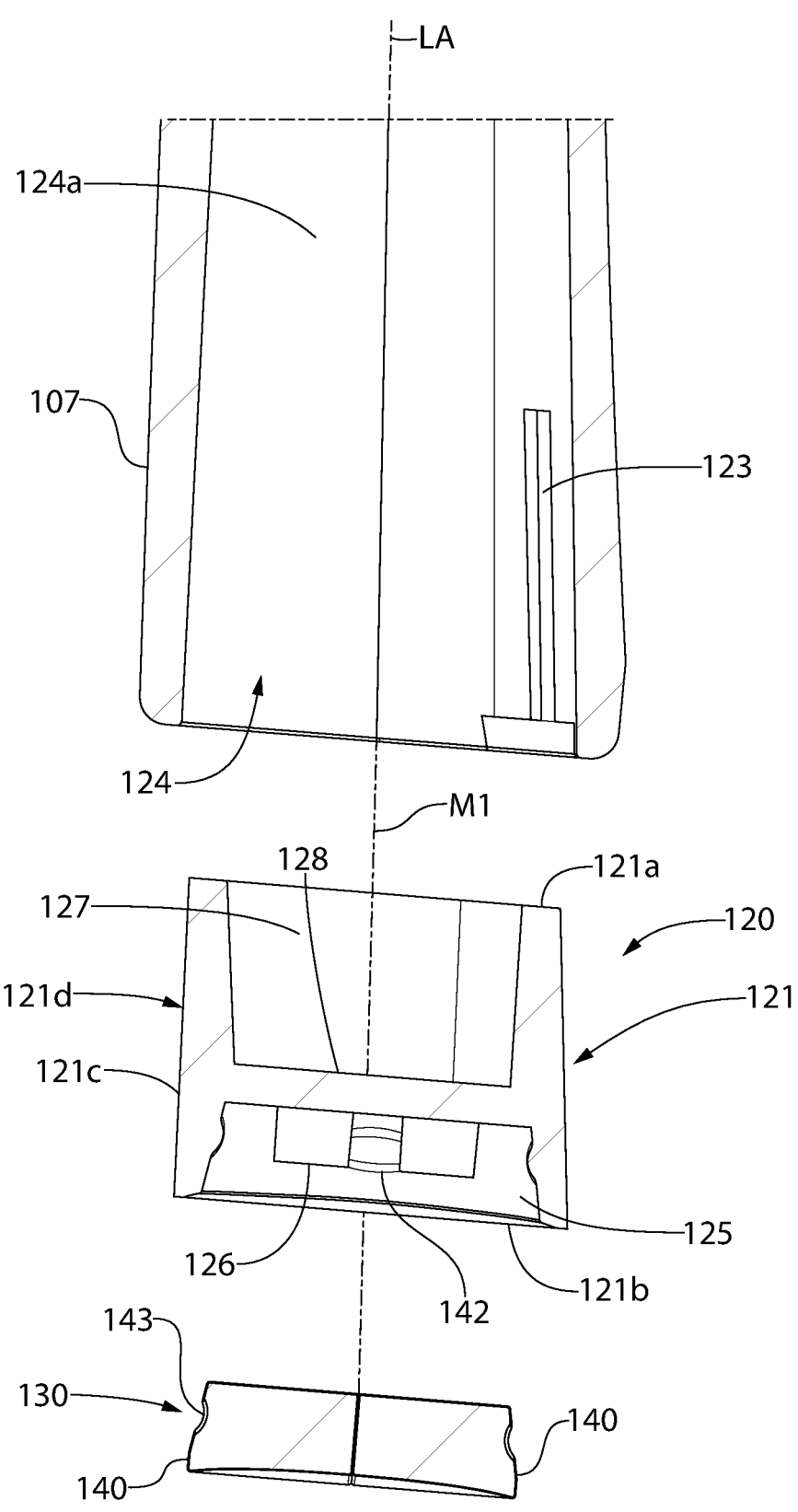
FIG. 10 is an exploded side cross sectional view of the proximal end of the oral care implement of FIG. 1 showing the tracking attachment housing and colored tracking marker assembly.
Figure 11:
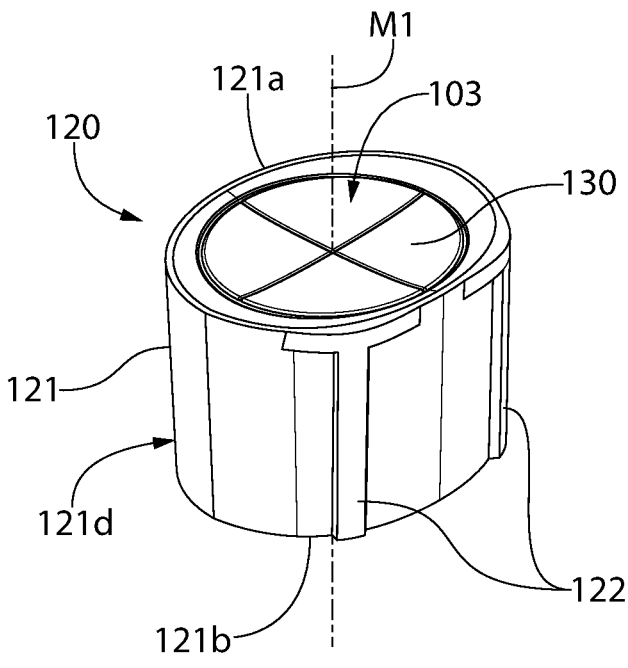
FIG. 11 is a bottom perspective view of the tracking attachment housing and colored tracking markers assembled to the housing.
Figure 12:
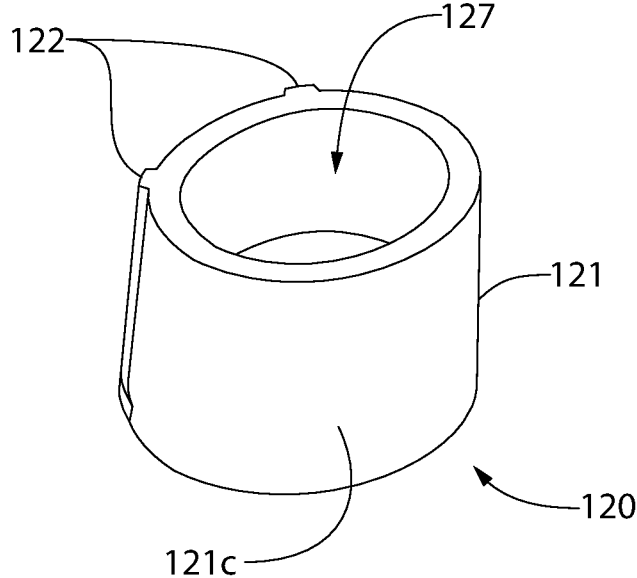
FIG. 12 is a top perspective view thereof.
Figure 14:
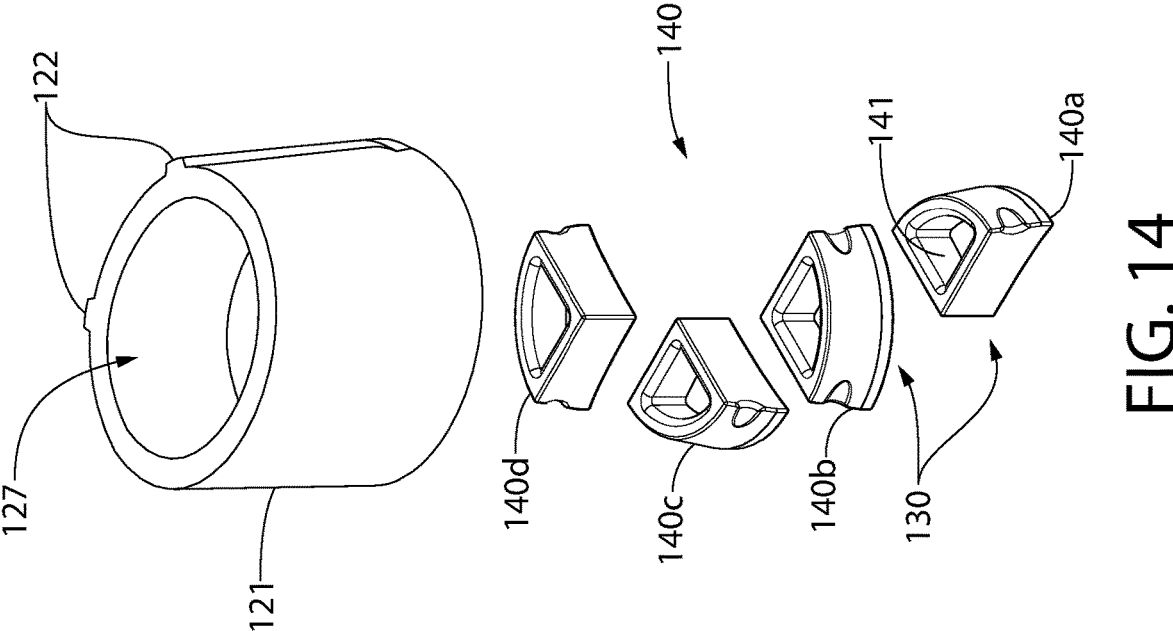
FIG. 14 is a top exploded perspective view thereof.
Figure 13:
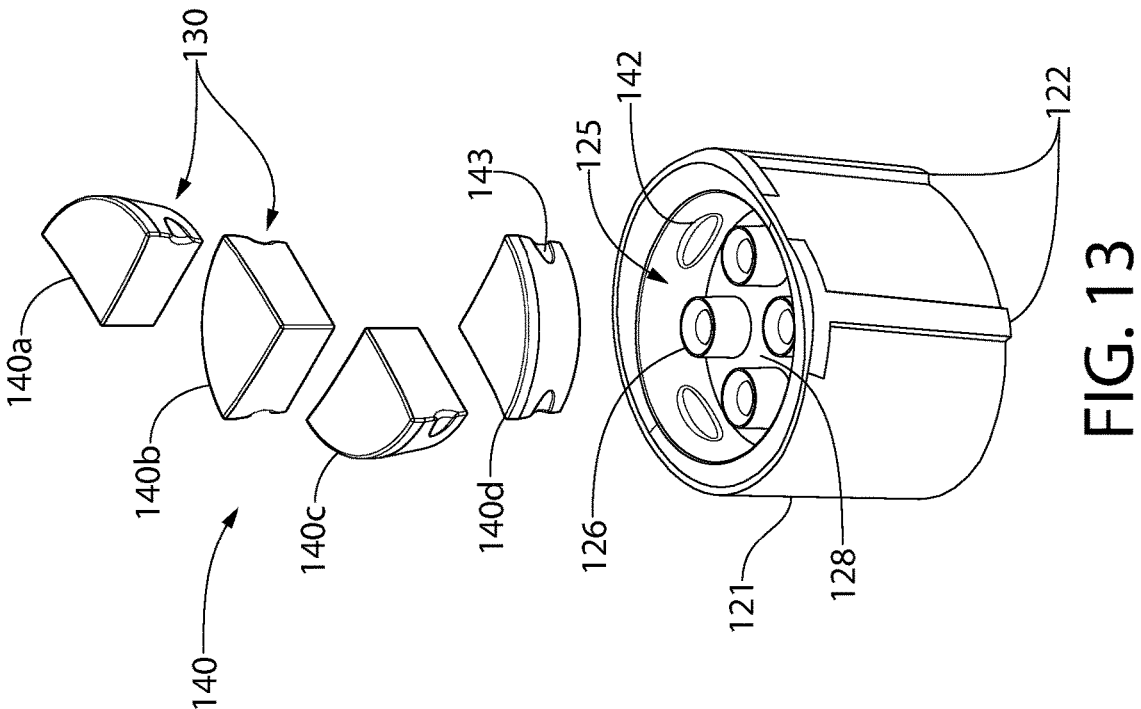
FIG. 13 is a bottom exploded perspective view of the tracking attachment housing showing individual colored wedges of the colored tracking marker assembly.
Figure 15:
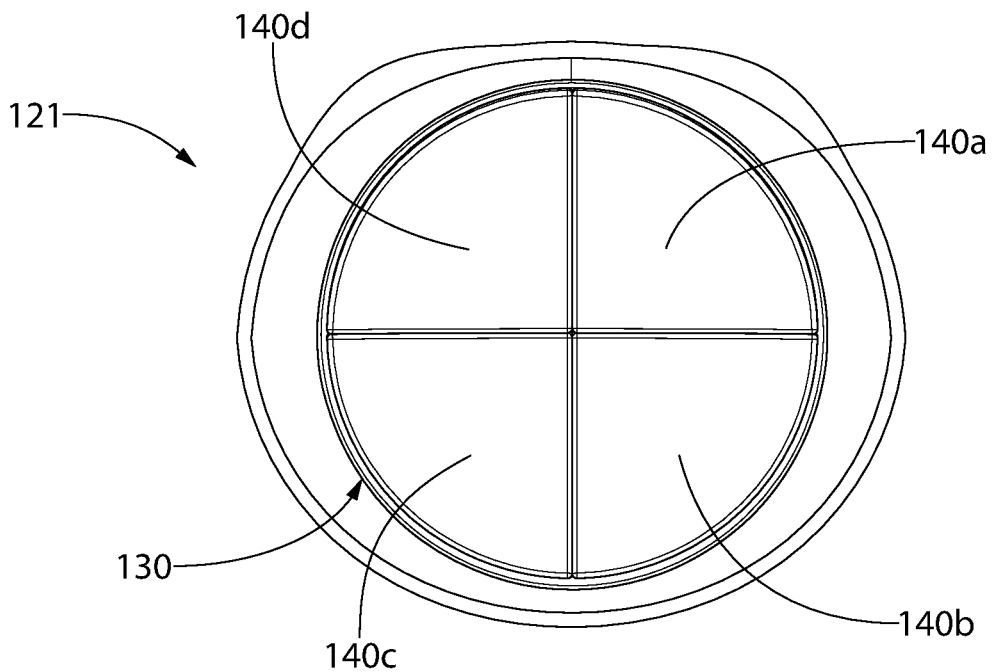
FIG. 15 is a bottom end view of the tracking attachment housing and colored tracking marker assembled to the housing.
Figure 16:
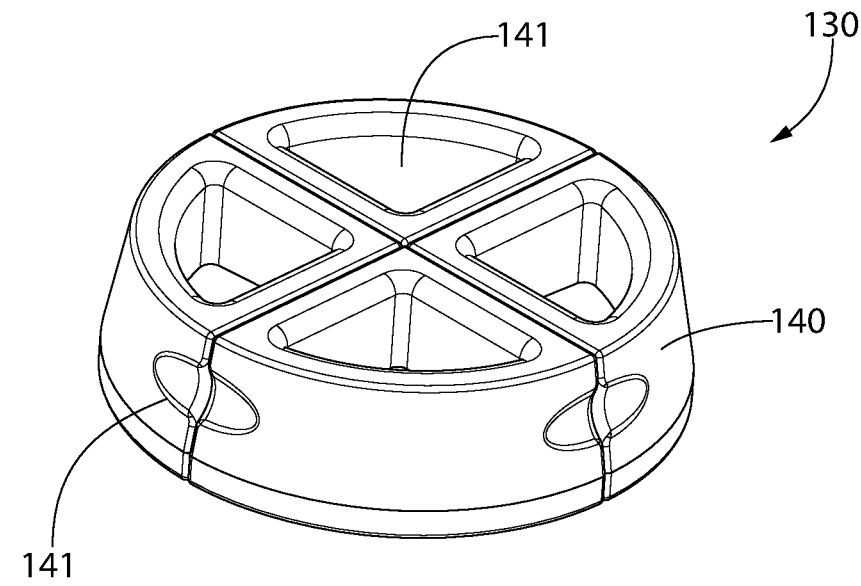
FIG. 16 is a top perspective view of the colored tracking wedges in isolation and an assembled configuration.

All drawings are schematic and not necessarily to scale. Features shown numbered in certain figures which may appear un-numbered in other figures are the same features unless noted otherwise herein. Referring herein to a figure by a number which figure include multiple figures bearing the same number but with different alphabetical suffixes shall be construed as a general reference to all of those figures unless noted otherwise.

DETAILED DESCRIPTION

The features and benefits of the invention are illustrated and described herein by reference to non-limiting exemplary (example) embodiments in which various aspects of the invention may be used. This description of embodiments is intended to be read in connection with the accompanying drawings or photos, which are to be considered part of the entire written description. Accordingly, the disclosure expressly should not be limited to such examples illustrating some possible non-limiting combination of features that may exist alone or in other combinations of features disclosed herein.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

As used throughout, ranges are used as shorthand for describing each and every value that is within the range. Any value within the range can be selected as the terminus of the range. In addition, all references cited herein are hereby incorporated by reference in their entireties. In the event of a conflict in a definition in the present disclosure and that of a cited reference, the present disclosure controls.

Referring to FIGS. 1-18, an oral care system 100 in one non-limiting embodiment according to the present disclosure generally includes an oral care implement 101 with visually-detectable multi-colored motion tracking features 103. The visually-detectable tracking features may be embodied in a visual tracking attachment 120 which may be configured for removable or permanent coupling to the toothbrush, as further described herein. The tracking features 103 are configured and arranged on the oral care implement to be detectable by an external standalone electronic visual motion detection system implemented by an external motion tracking unit 170 not onboard the oral care implement 101.

Figure 18:
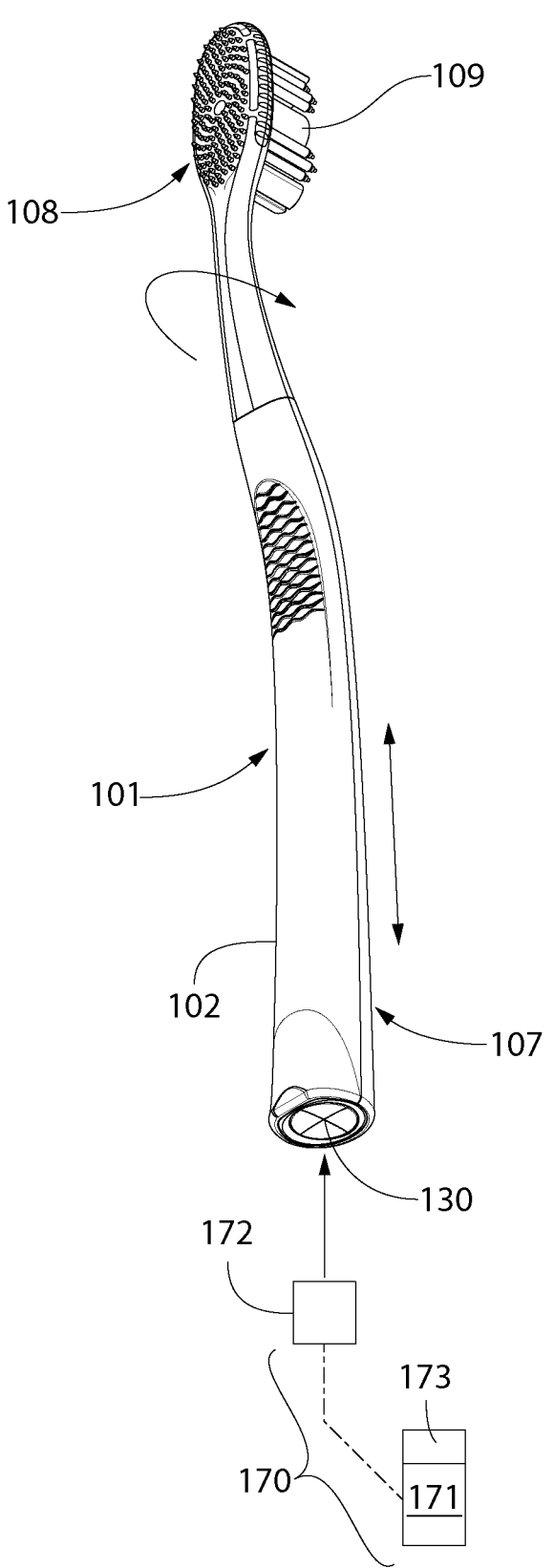
FIG. 18 is a schematic diagram of a motion tracking unit usable with the oral care implement of FIG. 1 with tracking attachment to detect the movement, orientation, position, and the like of the oral care implement during a tooth brushing exercise.
Figure 19:
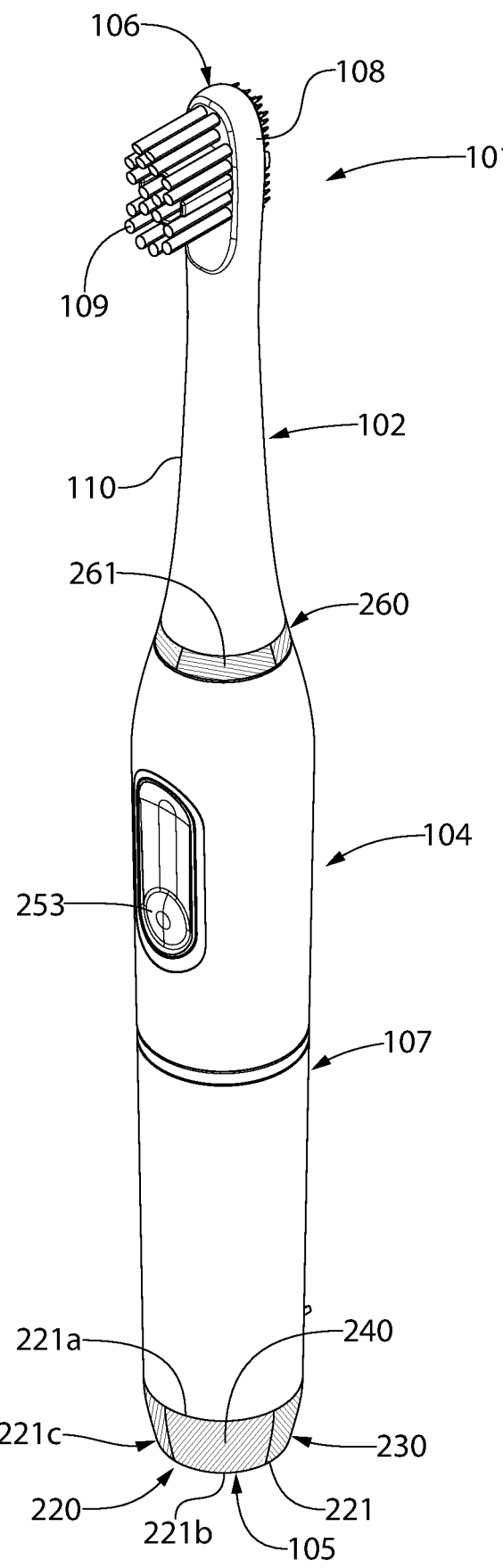
FIG. 19 is a top front perspective view of an oral care system including an oral care implement with motion tracking attachment coupled thereto in accordance with an alternative embodiment according to the present disclosure.
Figure 20:
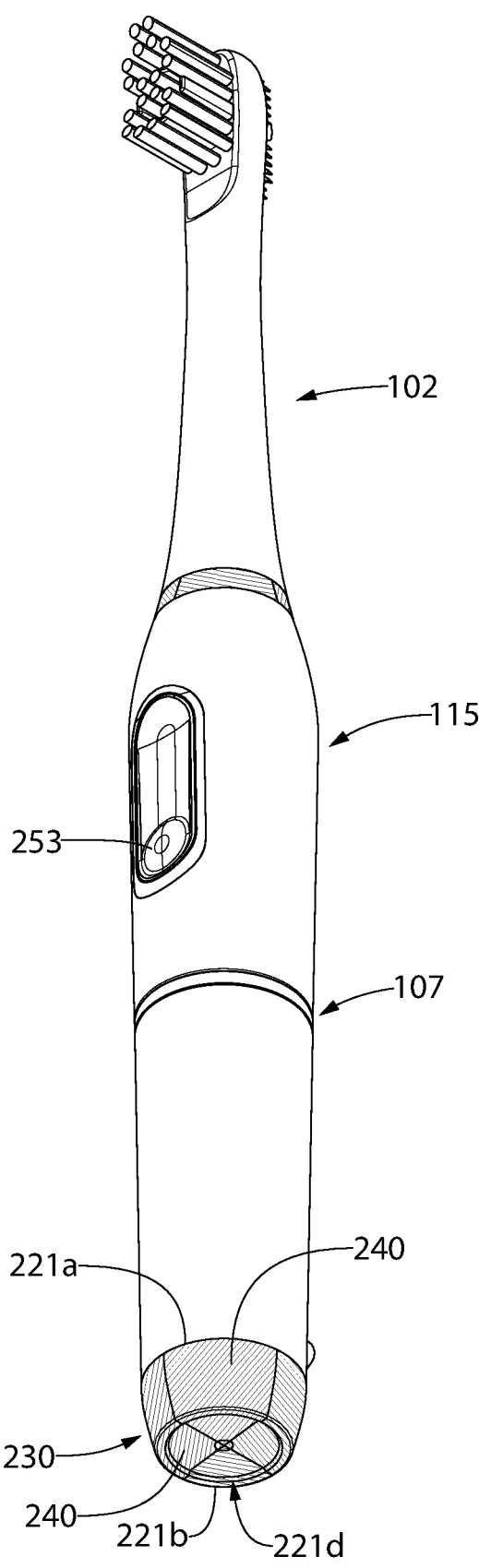
FIG. 20 is a bottom front perspective view thereof.
Figures 21, 22:
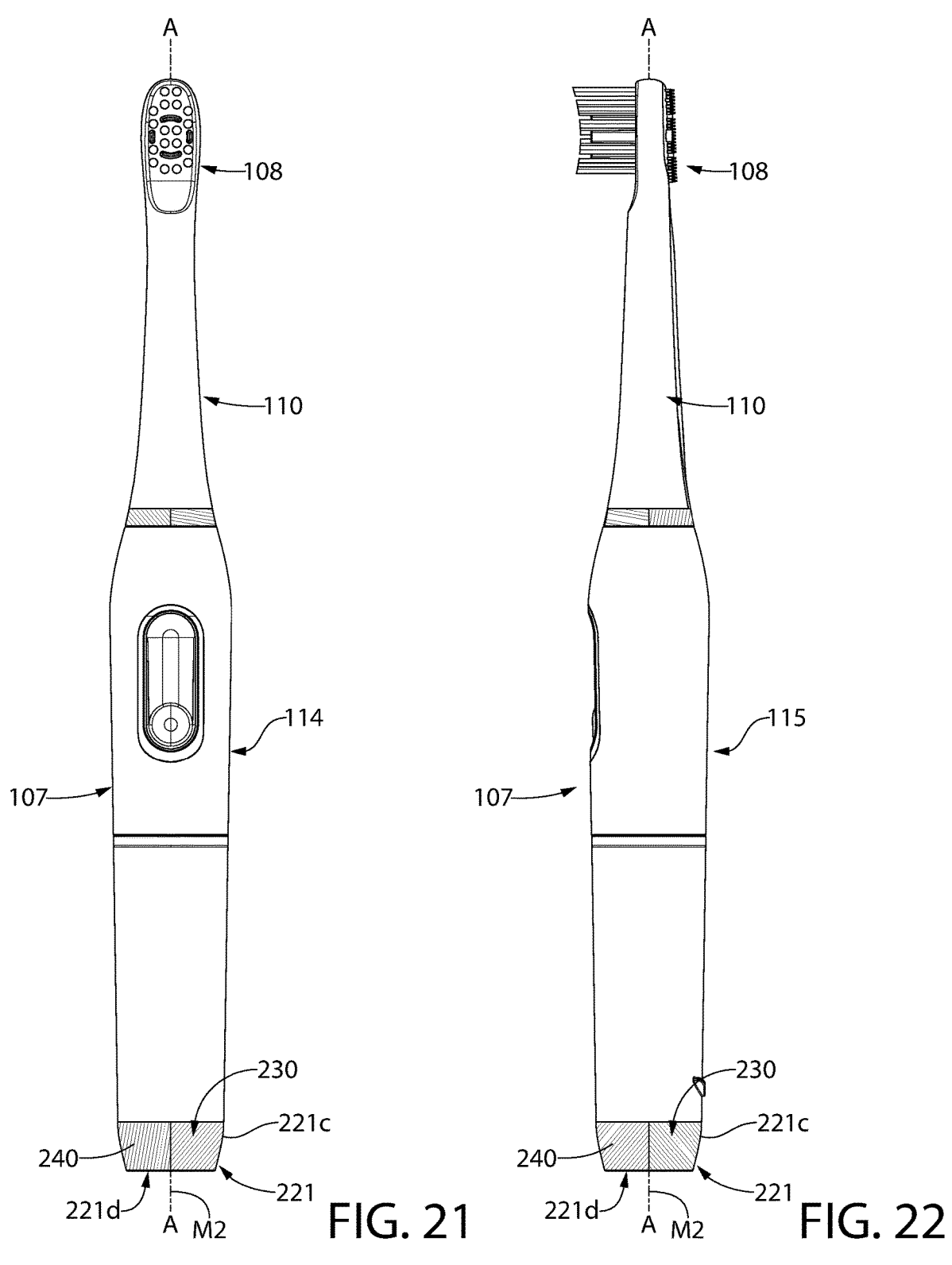
FIG. 21 is a front view thereof.
FIG. 22 is a lateral side view thereof.
Figure 23:
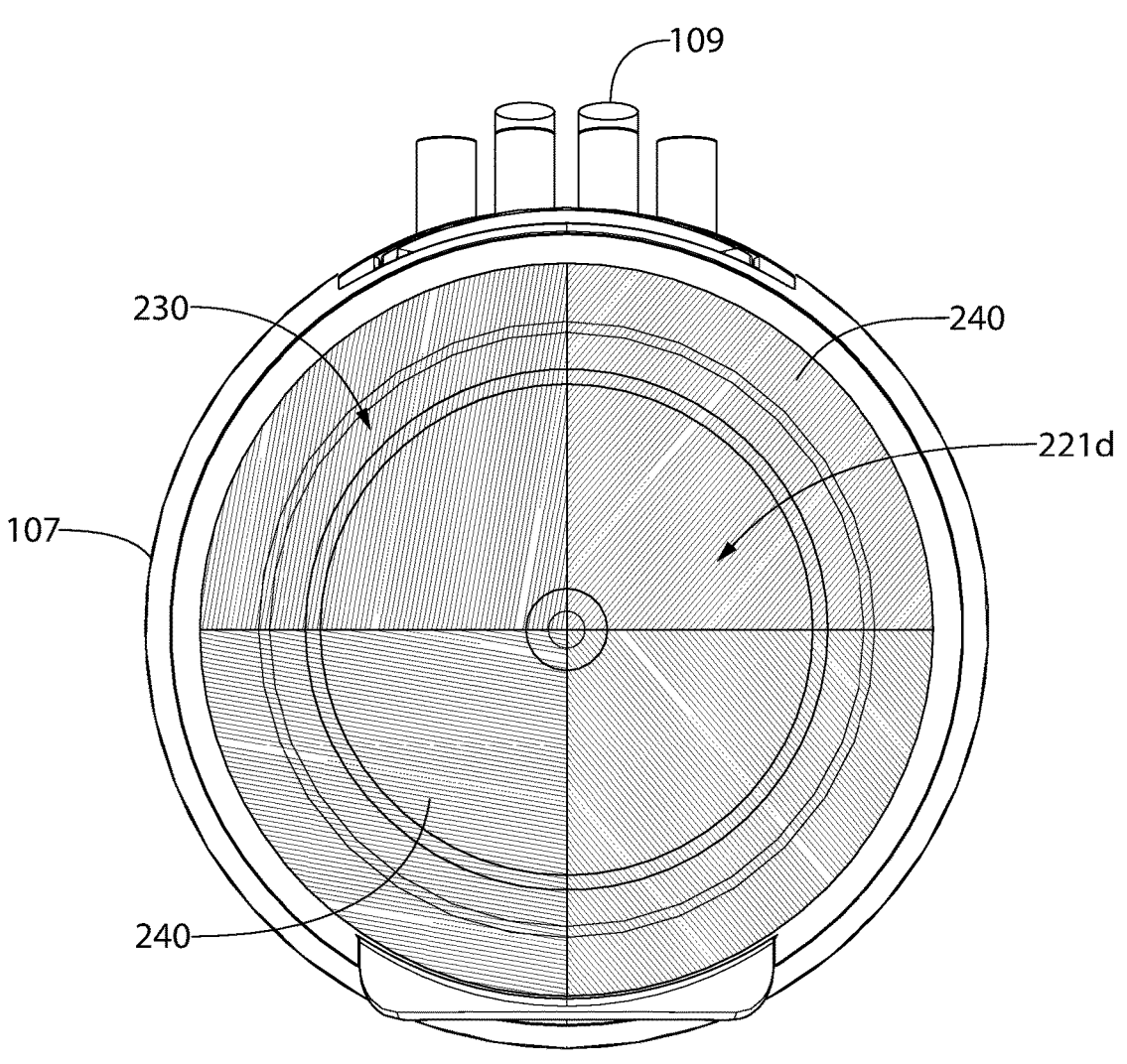
FIG. 23 is a bottom proximal end view thereof.

FIG. 18 is a schematic diagram showing motion tracking unit 170 and the motion tracking attachment 120 of the oral care implement 101 in the field of view of camera 172 of the unit during brushing activities initiated by the user. The motion tracking unit 170 in one embodiment may include a programmable processor 171 which may be a microprocessor operably coupled with a digital tracking camera 172 that can be positioned with a line of sight (i.e. field of view) of the toothbrush and multi-colored tracking features 103 thereon when the user is brushing his or her teeth to track the motions of the toothbrush 102. In addition to processor 171 and tracking camera 172, the motion tracking unit 170 may include all of the usual electronic appurtenances and devices normally associated with a fully functional processor-based system such as non-transitory tangible computer readable medium including but not limited to volatile and/or non-volatile memory 173 operable to store the programmed operating instructions or control logic (e.g. software) executable by the processor. It is well within the ambit of those skilled in the art to provide and/or procure such a processor-based motion tracking systems without further undue elaboration here. The processor, camera, memory, and other appurtenances of the tracking unit 170 may be disposed in a single outer enclosure/housing, or in multiple discrete enclosures/housings.

In some embodiments, the motion tracking unit 170 and foregoing processor 171, camera 172, and memory 173 may be embodied in a user's personal electronic device (PED) 175, such as for example without limitation a smart tablet (e.g. iPad, etc.) smart phone (e.g. iPhone, Android, etc.), notebook, laptop, etc. In such embodiments, the PED executes a software application ("app") which may be resident in the PED's onboard memory. In other possible embodiments, however, the motion tracking unit 170 may be embodied in a separate dedicated electronic device which includes the processor and tracking camera identified above. Accordingly, the type of electronic device in the processor-based motion tracking unit is embodied is not limited to any particular type of device or product platform and shall be broadly construed.

Motion tracking unit 170 via executing the programmed operating instructions or control logic step is configured to track the brushing motions of oral care implement 101 implemented by the user via the multi-colored tracking features 103 further described herein. Such "brushing motions" are too broadly construed herein as including but not limited to following and tracking at least one of the position, orientation (angular/twist, horizontal, vertical, etc.), movement, location of the head of the oral care implement 103, and the like within the oral cavity of the user during the brushing activity. The tracking unit 170 preferably tracks multiple of these aspects characterizing the motion of oral care implement during the activity of brushing.

In the non-limiting illustrated embodiment, the oral care implement 101 may be in the form of a manual toothbrush 102. However, in certain other embodiments the oral care implement 101 can take on other forms such as being a powered electric toothbrush (having a vibrating or otherwise moving head/cleaning element section), a tongue scraper, a gum and soft tissue cleanser, a water pick, an interdental device, a tooth polisher, a specially designed ansate implement having tooth engaging elements or any other type of implement that is commonly used for oral care. Furthermore, although described herein as being an oral care implement, the inventive device may also be a personal care implement such that it is an implement used for personal care but not necessarily for oral care, such as a razor, a hairbrush, a makeup applicator, or the like. Thus, it is to be understood that the inventive concepts discussed herein with respect to the multi-colored tracking features 103 can be applied to any type of oral care implement or personal care implement unless a specific type of oral care implement or personal care implement is specified in the claims.

Referring generally to FIGS. 1-10, toothbrush 102 comprises an elongated body 104 extending from a proximal end 105 to a distal end 106 along a longitudinal axis A-A. The longitudinal axis defines an axial direction for convenience of reference. A transverse direction is defined herein is being perpendicular or acutely angled relative to the longitudinal axis A-A. Toothbrush body 104 further includes a front side 112, opposite rear side 113, and pair of opposing lateral sides 114. The body 104 further includes outer surfaces 115 formed collectively by the head 107, head 108, and neck 110. The terms distal, distal end, proximal, proximal end, front side, rear side, lateral sides, outer surfaces, etc. described herein may be used as a common reference to any of the portions, ends, and surfaces of the head 107, head 108, neck 110, tracking attachment 120, or other features of the oral care implement alone or in combination (e.g., proximal end of handle, lateral side of head, outer surface of neck, etc.).

Body 104 of toothbrush 102 includes a handle 107 configured for gripping by a user during oral hygiene activities such as brushing the teeth, a head 108 including tooth cleaning elements 109, and a neck 110 connecting the handle to the head. The handle 107 defines the proximal end 105 of the toothbrush body 104. Head 108 defines the distal end 106. In certain embodiments, neck 110 may typically be an axially elongated structure being narrower/smaller in cross-sectional area (measured transversely to longitudinal axis A-A) than the head or handle.

Handle 107 of toothbrush 102 may have various contours and shapes provided for user comfort when handling the toothbrush and brushing. The handle may be formed of any suitable material or combination of different materials such as for example without limitation rigid plastic materials including polymers and copolymers of ethylene, propylene, butadiene, vinyl compounds and polyesters such as polyethylene terephthalate, etc., and/or flexible and less rigid resilient thermoplastic elastomeric materials.

In one non-limiting embodiment, the handle 107, head 108, and neck 110 of toothbrush 102 may form integral parts of a single monolithic unitary toothbrush body 104. In other embodiments, the head 108 and neck 110 may be integrally formed parts of a monolithic unitary "replacement head" 111 structure configured for detachable coupling to the distal end of the handle 107 by any suitable coupling means used in the art. In one non-limiting example, replacement head 111 defines a proximally open socket 111a which receives an axially and distally extending mounting post 111b formed on the proximal end of the handle 107 (see, e.g., FIGS. 8A and 9A). Such detachable replacement heads allow the user to re-use the handle and replace the head with integral neck only when the tooth cleaning elements 109 are worn out thereby avoiding the need to replace the entire toothbrush with the multi-colored visual tracking attachment 120. The toothbrush body 104 and/or replacement head 111 if used may be formed by any suitable means used in the art, including for example without limitation injection molding, milling, machining and/or other suitable formation processes. However, in other embodiments the handle 107 and portion including the head 109 and neck 110 may be formed as separate components which are operably connected at a later stage of the manufacturing process by any suitable technique known in the art, including without limitation thermal or ultrasonic welding, a friction-fit assembly, a coupling sleeve, threaded engagement, adhesion, fasteners, etc.

The tooth cleaning elements 109 of head 108 extend transversely outwards from front side 112 of the head 108 and are fixedly anchored thereto by any suitable means used in the art. The exact combination, types, structure, pattern, orientation and material of the tooth cleaning elements 109 is not limiting of the present invention unless so specified in the claims. As used herein, the term "tooth cleaning elements" is used in a generic sense to refer to any structure or combination of structures that can be used to clean, polish or wipe the teeth and/or soft oral tissue (e.g. tongue, cheek, gums, etc.) through relative surface contact. Common examples of "tooth cleaning elements" include, without limitation, bristle tufts, filament bristles, fiber bristles, nylon bristles, spiral bristles, rubber bristles, elastomeric protrusions, flexible polymer protrusions, combinations thereof and/or structures containing such materials or combinations. Suitable elastomeric materials include any biocompatible resilient material suitable for uses in an oral hygiene apparatus. To provide optimum comfort as well as cleaning benefits, the elastomeric material of the tooth or soft tissue engaging elements may have a hardness property in the range of A8 to A25 Shore hardness. One suitable elastomeric material is styrene-ethylene/butylene-styrene block copolymer (SEBS) manufactured by GLS Corporation. Nevertheless, SEBS material from other manufacturers or other materials within and outside the noted hardness range could be used.

The tooth cleaning elements 109 can be connected to the head 108 of toothbrush 102 in any manner known in the art. For example, staples/anchors, in-mold tufting (IMT) or anchor free tufting (AFT) could be used to mount the cleaning elements/tooth engaging elements. In certain embodiments, the invention can be practiced with various combinations of stapled, IMT or AFT bristles. In AFT, a plate or membrane is secured to the brush head such as by ultrasonic welding. The bristles extend through the plate or membrane. The free ends of the bristles on one side of the plate or membrane perform the cleaning function. The ends of the bristles on the other side of the plate or membrane are melted together by heat to be anchored in place. Any suitable form of cleaning elements may be used in the broad practice of this invention. Alternatively, the bristles could be mounted to tuft blocks or sections by extending through suitable openings in the tuft blocks so that the base of the bristles is mounted within or below the tuft block.

The tracking attachment 120 is separate component which is detachably or permanently coupled to the oral care implement 101 (e.g., toothbrush 102), as noted above. In the various non-limiting embodiments described herein, the tracking attachment 120 is merely structural in nature and does not include any electrical/electronic components all of which reside in the visual-based motion tracking unit 170 in one implementation. Thus, the tracking attachment 120 is free of a power source, battery, processor, controller, sensors, electrodes, chips, printed circuit boards, circuits, resistors, capacitors, inductors, transistors, transformers, switches, fuses, conductors, or any other type of device that may be considered an electrical component. Rather, the tracking attachment 120 is formed entirely of non-electrical components, and the tracking attachment also does not house any electrical/electronic components. It bears noting that although the tracking attachment 120 does not house electrical/electronic components, the oral care implement 101 in some possible embodiments may be powered toothbrush with vibrating and/or oscillating tooth cleaning elements 109 as commonly known in the art. Therefore, in such embodiments, certain internal portions of the toothbrush handle 107 may house electrical/electronic components and batteries even though the tracking attachment 120 does not. Accordingly, this does not alter the non-electrical nature of the tracking attachment.

The tracking attachment 120 is configured and structured to permit tracking the brushing motions of the oral care implement 101 (e.g., toothbrush 102) by the visual-based electronic motion tracking unit 170 previously described herein. The tracking attachment 120 is capable of doing this despite being free of electrical components in the exemplified embodiment based on the different colored tracking features 103 embodied in the attachment. When the tracking attachment is attached to the oral care implement and used in conjunction with the digital camera 172 of the electronic tracking unit 170 and specifically configured software (control logic/algorithms), the tracking attachment 120 assists the unit in tracking the movement, position, orientation, or the like of the oral care implement 101 to which it is attached.

Specifically, the motion tracking unit 170 with programmable processor 171, digital tracking camera 172 (which may include one or more cameras), and memory 173 storing and executing the appropriately configured software/control logic algorithms can track movement of the oral care implement 101 based on the color, location, and movement of the various visual tracking features 103 provided (further described herein) of the tracking attachment 120. The structural and motion tracking features of the tracking attachment 120 will next be described in greater detail below. However, the algorithms, software, and processors that are used to track movement of the oral care implement based on the visual markers of the tracking attachment 120 will not be described in any great detail herein because it is not the focus of this invention. Such programmable motion detecting and tracking systems usable with the present motion-trackable oral care implement 101 with tracking features 103 include those disclosed in commonly-owned U.S. Pat. Nos. 10,799,155 and 11,006,862; which are incorporated herein by reference. The software program instructions/steps and associated processing that occurs via the processor may be similar to that which is described in these patents or different.

FIGS. 1-18 show a first embodiment of tracking attachment 120 which comprises a housing 121 that includes multi-color tracking features 103 such as colored tracking indicia or markers 130. FIGS. 8B, 9B, 10, and 11-17 in particular focus primarily on the tracking attachment housing 121 and parts thereof. Referring to the foregoing figures, housing 121 may be configured for coupling to proximal end 105 of handle 107 of the oral care implement 101, such as in one non-limiting embodiment toothbrush 102. The housing 121 includes distal end 121a, proximal end 121b, and lateral sides 121c extending axially between the ends which defines an outer side surface 121d of the housing body. A mounting axis M1 is defined as extending between and through the ends and geometric center of the housing. In such a case, the mounting axis M1 of the tracking attachment housing 121 may be coaxially aligned with the portion of the longitudinal axis A-A of the toothbrush at the proximal end 105 of the toothbrush handle 107 when the housing is coupled to the handle (see, e.g., FIG. 10).

Housing 121 of tracking attachment 120 may have any suitable configuration, which may be generally complementary configured to the cross-sectional shape of the toothbrush handle 107 to which the attachment is coupled. In the non-limiting illustrated embodiment, the body of the housing has a substantially cylindrical body in configuration with a polygonal shape in cross section such as a substantially circular shape (albeit not necessarily perfectly circular as shown). Other embodiments of housing 121 may have a polygonal or a combined/compound polygonal and non-polygonal shape in cross section. Accordingly, the cross-sectional shape of the tracking attachment housing does not limit the invention. Housing 121 may be formed of any suitable material. In some embodiments, the housing may be formed of a suitable substantially rigid plastic including for example without limitation any of the plastic materials noted herein for the handle 107 of the toothbrush 102, acrylonitrile butadiene styrene, polypropylene, polyethylene, etc.

In one configuration, housing 121 of tracking attachment 120 is configured for axial insertion (along the longitudinal axis A-A) into an outwardly and axially open receptacle 124 formed in the bottom (i.e. proximal end 105) of the toothbrush handle 107. The receptacle may be a proximal portion of a larger open interior space 124a formed within handle 107 which may have use for other purposes such as housing electronics and a battery associated with an electric toothbrush with vibrating/oscillating tooth cleaning elements, oral care fluid storage for dispensing oral care fluids (e.g., whitening or anti-bacterial agents, etc.) associated with fluid dispensing toothbrushes, or for other reasons.

Whether strictly a manual or electric toothbrush, receptacle 124 of toothbrush 102 is complementary configured in cross section to the cross-sectional shape of the tracking attachment housing 121. The housing 121 is configured and may have an axial length which allows the housing to be completely inserted into the receptacle 124 at the open proximal end of the toothbrush handle. The proximal end 121b of the housing in such an embodiment does not protrude axially outwards beyond the proximal end 105 of the toothbrush 102 as shown. The proximal end 121b of the housing however may remain visible to the user but only when the toothbrush is viewed at an angle to the longitudinal axis A-A of the toothbrush or when looking at the proximal end of the handle 107 head on. In other possible configurations, however, a portion of the tracking attachment housing 121 may be configured to intentionally protrude axially outwards from the receptacle 124 in handle 107 for aesthetic and/or functional purposes. In such embodiments, the outer side surfaces of the housing 121 may be visible when the toothbrush is viewed transversely to the longitudinal axis of the toothbrush body 104.

In any of the preceding embodiments, the tracking attachment housing 121 may be configured such that it does not protrude laterally and transversely outwards (relative to longitudinal axis A-A) beyond the toothbrush body 104. Specifically, housing 121 does not protrude outwards in a lateral direction beyond the front side, rear side, or lateral sides of the toothbrush handle 107 and outer surfaces formed thereon. Advantageously, unlike some past approaches which include bulbous spherical or globe shaped tracking devices that protrude laterally outwards farther than adjoining portions of the toothbrush handle to which they are attached, the present housing 121 preserves the original streamlined appearance and comfortable grip and handling of a conventional toothbrush.

Housing 121 of tracking attachment 120 in some non-limiting embodiments may further be rotationally keyed to the toothbrush handle 107 by mutually engageable anti-rotation features formed on each of the housing 121 and toothbrush handle 107. This ensures the proper rotational positioning of the housing relative to the toothbrush body 104 when the housing is inserted into in the receptacle 124 in the toothbrush handle. The anti-rotational features in one non-limiting embodiment may include at least one axially oriented and elongated longitudinal key rail 122 formed on the housing 121 (first anti-rotation feature) which is slideably received in a corresponding longitudinal keyway channel 123 formed in the body of the toothbrush handle 107 inside receptacle 124 (second anti-rotation feature). Rails

122 may be formed on the outer surface of the housing 121 in one implementation. The foregoing arrangement of anti-rotation features may be reversed in other embodiments to achieve the same anti-rotational fixation (i.e. key rails 122 in receptacle 124 of handle 107 and keyway channels 123 in housing 102). Multiple key rails and keyway channels may be provided in some embodiments as illustrated. The key rails 122 extend for a majority of the axial length of the housing 121 measured between the distal and proximal ends 121a and 121b, respectively.

It bears noting that the anti-rotational features described above (e.g., rails 122 and channels 123) ensure that the different color visual markers 130 are positioned and oriented properly with respect to their preselected angular positions chosen when the tracking attachment housing 121 is attached to the toothbrush 102. These preselected positions may coincide with specifically selected portions, sides, surfaces, or cross-sectional quadrants of the toothbrush body 104 (e.g., front side, rear side, lateral sides, etc.) and which are used by the visual detection motion tracking unit 170 to ascertain the motion, position, and orientation of the toothbrush 102 during the brushing motions implemented by the user. Therefore, the placement and position of the differently colored tracking markers 130 are not arbitrary but rather predetermined for tracking purposes.

Accordingly, the foregoing anti-rotation features (e.g., rails 122 and channels 123) prohibit the tracking attachment 120 from being coupled to the toothbrush handle 107 in anything other than a single preferred orientation. To expound on the above explanation, this may be important in some embodiments because it may be important for visual markers 130 to be positioned at specific locations relative to the toothbrush head 108 and tooth cleaning elements 109 thereon to ensure that these visual markers are properly detected and read by the camera 172 of motion tracking unit 170 for position, orientation, and movement tracking of the head in the oral cavity of user during use of the oral care implement, as described above. It is the tracking of the head 108 within the oral cavity during the brushing motion which is key for the tracking unit to determine if a proper brushing technique is being used and all surfaces of the teeth are adequately cleaned. Movement and angular position/orientation of the handle 107 can be readily correlated to the corresponding motions of the head 108 of the toothbrush within the oral cavity by the control logic preprogrammed in the motion tracking 170 since the head does not move independently of the handle.

The invention is not limited to the anti-rotation features described above in the form of the interlocking rails and channels, representing one possible implementation as a non-limiting example. In other possible embodiments, the anti-rotation features may instead or in addition be formed by the cross-sectional shape of the receptacle 124 in toothbrush handle 107 forming a first anti-rotation feature, and the mating cross-sectional shape of the tracking attachment housing 121 forming the second corresponding anti-rotation feature. Thus the handle 107 and the receptacle 124 may have complementary configured cross-sectional shapes that only allow for the tracking attachment housing 120 to be coupled to the handle 107 in a single rotational orientation relative to the handle. It will be appreciated that other forms of anti-rotation features on the handle and tracking attachment housing may be used and does not limit the invention so long as a predetermined rotational orientation of the housing relative to the toothbrush handle be achieved for the foregoing motion tracking reasons.

With continuing general reference to FIGS. 1-18, the colored tracking markers 130 which form the visually-detectable tracking features 103 of the tracking attachment 120 observed by the motion tracking unit 170 may comprise at last two different colors. In the non-limiting illustrated embodiment in FIGS. 11-17 in particular, four tracking markers 130 each of which may be a different color may be used (each represented by a different colored inserts 140 configured as a pie shaped wedge in one embodiment as further described herein). In other possible embodiments, some but not all of the markers may be the same color. One criteria for selecting the exact colors used is that the processor 171 of the motion tracking unit 170 should be capable of readily distinguishing one color from the other to track the motion of the toothbrush 102. Accordingly, a number of different colors of sufficient intensity or depth of color may be used which meet this criteria. The present invention is therefore not limited to the color selection used for the tracking markers 130.

In one non-limiting configuration, tracking attachment housing 121 may include an outwardly and proximally open axial receiving cavity 125. In some embodiments, housing 121 may optionally include an inwardly and distally open extension cavity 127 which is in communication with the interior space 124a of the toothbrush handle 107 to provide additional space within the handle for other purposes as described elsewhere herein. In such embodiments, a transversely oriented partition wall 128 separates the receiving cavity 125 from the toothbrush handle extension cavity 127, and forms the base of the receiving cavity as shown. The receiving cavity may be generally circular in shape (in transverse cross section), or other shapes in other possible embodiments.

In the non-limiting illustrated embodiment best shown in FIGS. 13-17, the colored tracking markers 130 may be embodied in a plurality of colored inserts 140 which are slideably received in receiving cavity 125 of the tracking attachment housing 121. Inserts 140 comprise at least two different colors. Four inserts 140a, 140b, 140c, and 140d may be provided in some non-limiting embodiments; each of which may be different colors. Other numbers of inserts may be provided and does not limit the invention. The colored inserts 140 in one embodiment may be formed of plastic in one embodiment. Different colored plastics may be used for two or more of the inserts 140a-140d such that the bodies of the inserts are fully colored throughout including interior portions of the insert as opposed to just superficial surface coloring or painting only. However, in other possible embodiments surface coloring or painting alone may be used for the insert which is sprayed or otherwise applied over a common base colored underbody (e.g., gray, black, white, etc.) shared by all inserts.

The colored inserts 140 may be wedge shaped in one non-limiting embodiment as shown and previously noted; each insert forming a quadrant or sector of a complete circular multi-colored tracking array when assembled together in the housing 121. Each insert includes a pair of converging straight sidewalls 144 intersecting at a pointed apex 145, an arcuately curved sidewall 146 extending between the straight sidewalls opposite the apex, and a flat top surface 147. Other shaped colored inserts however may be used in other embodiments. Regardless of shape, each colored insert 140 may have an inwardly open engagement recess 141 configured to frictionally engage one of several axial coupling protrusions 126 in receiving cavity 125 of the tracking attachment housing 121. Couplings protrusions 126 may have any suitable shape, such as without limitation cylindrical (see, e.g., FIG. 13), wedge shaped (see, e.g., FIG. 17), or other. The coupling protrusions 126 project in the axial and proximal direction (parallel to longitudinal axis A-A and mounting axis M1) from partition wall 128 of the tracking attachment housing 121. The coupling protrusions and recesses 141 of colored inserts 140 are cooperatively configured to form a tight friction or press (interference) fit therebetween which retains the wedge shaped inserts in the cavity 125 of the housing 121. However, other means for retaining the inserts 140 in the housing may be used such as adhesives, ultrasonic welding, etc. and does not limit the invention. In some embodiments, the colored inserts 140 and housing 121 (including coupling protrusions 126) may be each formed of a substantially rigid plastic material selected to facilitate forming the friction/press fit between the colored inserts 140 and the coupling protrusions 126 and housing 121.

In certain embodiments, additional locking features may optionally be provided to retain the colored inserts 140 in receiving cavity 125 of the housing 121. For example, each insert 140 may include one or more outward facing locking depressions 143 configured and arranged to engage mating locking projections 142 formed on tracking attachment housing 121 inside the receiving cavity. Locking projections 142 extend radially inwards from the inner side surface 121e of the sidewalls of the housing 121. In one embodiment, projections 142 may be arranged between pairs of coupling protrusions 126 (see, e.g., FIGS. 10 and 13). When each wedge shaped colored insert 140 is inserted into receiving cavity 125 of the housing, the locking projections 142 engage one or more mating locking depressions 143 on each insert to further secure the inserts in the housing. This provides a secondary retention feature in additional to the primary retention feature comprising the engagement and friction fit between coupling protrusions 126 of housing 121 and recesses 141 of the colored inserts 140 previously described herein.

Figure 17:
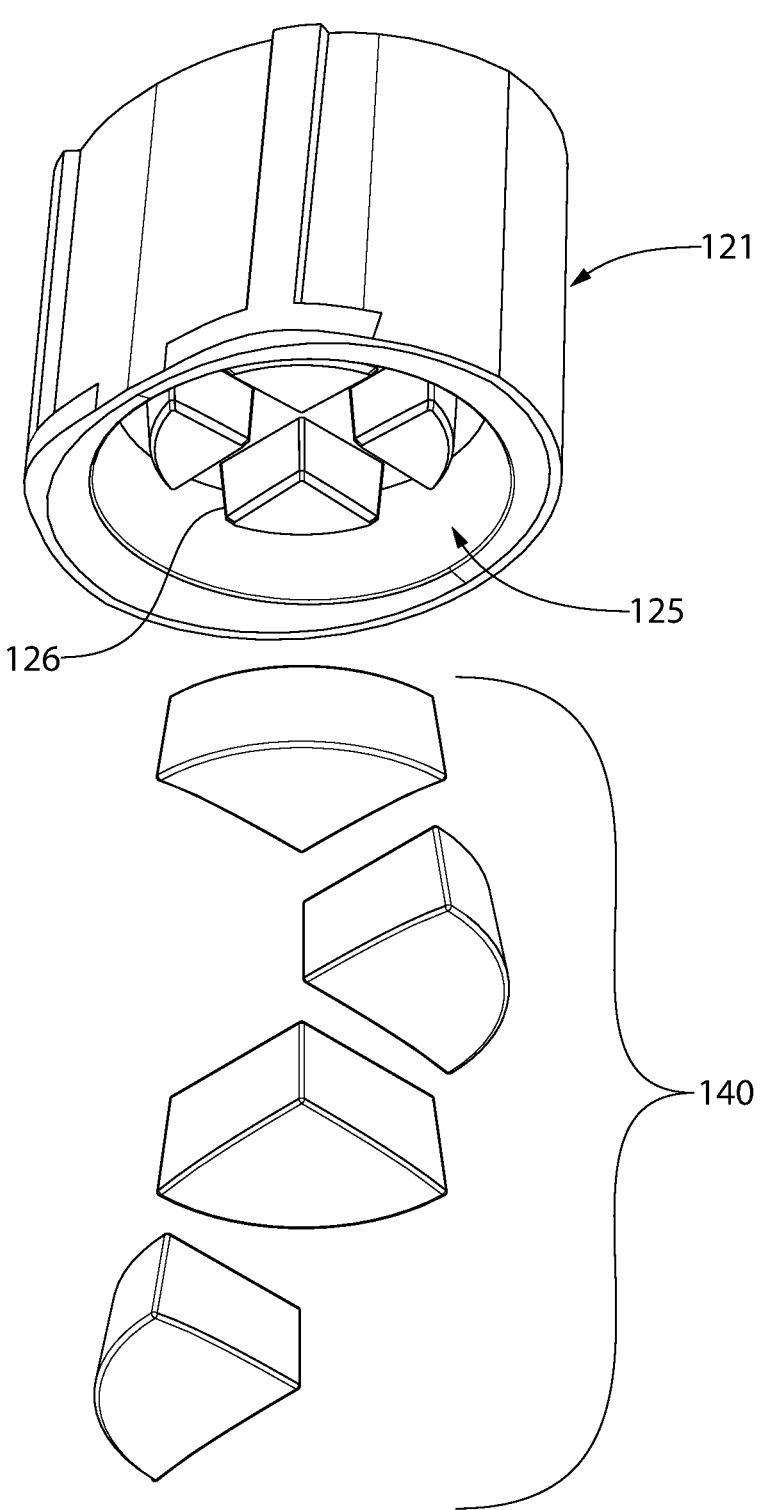
FIG. 17 is a bottom exploded perspective view of an alternative embodiment of the tracking attachment housing showing individual colored wedges of the colored tracking marker assembly.

The locking projections 142 in one non-limiting embodiment may be oval in shape. A pair of half-oval shaped locking depressions 143 may be provided on each inserts 140 in one embodiment; one half-oval depression being recessed into each end of the arcuately curved sidewall 146 of the insert 140 (see, e.g., FIGS. 13-16). When two adjacent wedge-shaped inserts 140 are inserted into the tracking attachment housing 121, a complete oval locking depression 143 is collectively formed which engages one of the locking projections 142. Other shaped locking depressions and projections however may be used. In some embodiments as shown in FIG. 17, the locking depressions and projections may be omitted entirely and the coupling protrusions 126 and mating recesses 141 formed in each insert 140 are relied upon alone to lock the inserts in the housing 121.

A method or process for assembling an oral care implement 101 with visual tracking features will now be summarized. The process may begin with first selecting a set of wedge-shaped colored inserts 140 from a plurality of colored inserts, and mounting the selected set of colored inserts in the outwardly open receiving cavity 125 of the tracking attachment housing 121. The inserts in one assembly scenario may first be inserted and friction/press fit into receiving cavity 141 of the housing to engage the coupling protrusions 126, and then the housing is slideably inserted into the proximal open receptacle 124 of the toothbrush handle 107. Alternatively, in another assembly scenario, the housing is first inserted into the toothbrush handle following by then inserting each of the colored inserts 140 into the housing. Either scenario may be used. The multi-colored inserts 140 do not project outwards in the axial longitudinal direction (parallel to longitudinal axis A-A and mounting axis M1) beyond the receiving cavity 125 of the housing 121 and proximal end 105 of the toothbrush handle 107. The outer exposed ends of the inserts 140 and housing 121 therefore may be substantially flush or slightly recessed inwards with respect to the proximal end 105 of the toothbrush handle (see, e.g., FIGS. 7A-B) This allows the tracking attachment 120 with colored tracking markers to be visible to the motion tracking unit 170, while advantageously not modifying the regular shape/contours of the toothbrush 102 and allowing the toothbrush to be seated upright on a flat surface by the proximal end 105 of the handle 107.

In mounting the housing 121 to the toothbrush handle 107, the key rails 122 formed on the housing 121 are axially aligned with and then slideably inserted into and engaged with a corresponding longitudinal keyway channel 123 inside receptacle 124 of the handle as the housing is fully inserted therein. Housing 121 may be secured to and retained in the handle 107 by any suitable means including without limitation forming a friction or press (interference) fit therebetween such as between the outer surface of the housing and inside walls of the handle receptacle 124 and/or rails 122 and channels 123, ultrasonic welding, adhesives, combinations thereof, or other.

FIGS. 19-23 show a second embodiment of an oral care implement 101 comprising a visual tracking portion 220 that includes multi-colored tracking features 203 such as colored tracking indicia or markers 230 which are visually detectable by motion tracking unit 170. In that regard, the colored tracking markers 230 function in principle the same way as the colored markers 130 of tracking attachment 120 previously described herein, which are tracked by tracking unit 170 during brushing activities of the user to detect motions of the toothbrush. Features and aspects of toothbrush 102 remain the same as described above and will not be repeated here for brevity.

In one non-limiting embodiment, the colored tracking portion 220 may be formed as a monolithic unitary part of the handle 107 of the oral care implement 101 and is disposed on the proximal end 105 thereof. In another non-limiting embodiment, the tracking portion 220 may be formed as a separate end cap 221 configured for detachable or permanent coupling to the proximal end 105 of handle 107 of the oral care implement 101, such as in one non-limiting embodiment toothbrush 102. The features and description of the tracking portion 220 which follows below (including without limitation tracking markers 230) are applicable to either of the foregoing embodiments whether the tracking portion 220 is integrally formed with the handle 107 or embodied as an end cap 221 separately attachable to the toothbrush 102. For brevity, the discussion below is based on the latter end cap embodiment alone bearing that in mind.

The end cap 221 includes distal end 221a and proximal end 221b. Mounting axis M2 is defined as extending between and through the ends and geometric center of the housing. In such a case, the mounting axis M2 of the colored tracking end cap 221 may be coaxially aligned with the portion of the longitudinal axis A-A of the toothbrush at the proximal end 105 of the toothbrush handle 107 when the end cap is coupled to the handle. Any suitable means may be used to couple end cap 221 to toothbrush handle 107, including for example without limitation a threaded coupling, adhesives, ultrasonic welding, mechanical fasteners, friction or press (interference) fit, etc.

The end cap 221 with tracking markers 230 further comprises lateral sides 221c which extend in the longitudinal direction along the length of the toothbrush 102 and circumferentially thereabout, and a bottom surface 221d at the proximal end 221b of the end cap. Bottom surface 221d may be flat in one non-limiting embodiment. As opposed to the housing 121 of tracking attachment 120 with colored tracking markers 130, the colored tracking markers 230 on present motion tracking end cap 221 remain visible from the lateral sides 114 of the toothbrush body 104 since the cap is not inserted into a receptacle of the toothbrush handle 107. Specifically, tracking markers 230 are visible from both the lateral sides 221c and bottom surfaces 221d of the end cap as shown.

The tracking markers 230 in one non-limiting embodiment may be formed by a plurality of colored panels 240 created on end cap 221 by any suitable means such as superficial surface coloring, 3D printing, painting, or other suitable methods. The panels provide visually-detectable colored markers and include at least two different colors or as many as may be required for proper visual detection by and operation of the motion tracking function of the visual-based motion tracking unit 170 previously described herein.

The colored panels 240 on end cap 221 originate and are disposed on the bottom surface 221d of the end cap. Each colored panel extends radially/laterally outwards and then turns upwards along the lateral sides 221c of end cap 221 in the axial or longitudinal direction to the distal end 221a of the cap as shown. Colored panels 240 therefore each include a bottom portion 240b disposed on the bottom surface 221d of end cap 221 and a side portion 240a disposed on the lateral sides 221c of the cap; each portion being of the same color. The bottom and side portions 240b, 240a of each colored panel 240 are contiguous such that a color of each colored panel begins on the bottom surface of the end cap and is continuous through a transition between the bottom and side portions without interruption in color.

When viewed looking towards the proximal end 105 of the toothbrush 102 in the distal direction towards the distal end 106 of the toothbrush, the bottom portions 240b of each colored panel 240 on the bottom surface 221d of end cap 221 may be pie wedge shaped with the bottom portions of the panels forming sectors of a complete circular array of different colored tracking markers 230 in one embodiment Each colored panel 240 originates at the geometric center of the end cap bottom surface 221d forming an apex of the bottom portion 240b of the colored panel. The bottom portion 240b of the colored panels 240 on the bottom surface 221d each gradually widen out moving the radially/laterally outward direction as shown. The adjoining side portion 240a of each colored panel may be square or rectangular shaped in appearance as shown.

It bears noting that the continuity of each colored panel 240 from the bottom surface 221d of the end cap 221 up onto the lateral sides 221c of the cap advantageously provides a greater visible area of color of each panel within the field of view of the camera 172 of the motion tracking unit from multiple angles. This advantageously increases the motion tracking unit's ability to detect the motions and movements of the toothbrush 102 by allowing for detection of the colored panels 240 from the lateral sides 221c, bottom surface 221d, or angles therebetween. This lessens the burden on the user to ensure that the colored panels 240 will remain visible to the motion tracking unit when brushing the teeth and holding the toothbrush at different angles during the process.

To further aid motion tracking unit 170 for detecting and tracking the motion of the toothbrush 102 during brushing including at least one of a position, orientation, or movement of the oral care implement by the user, some embodiments may optionally include a multi-colored neck band 260 spaced distally apart from the end cap 221. Neck band 260 may be located between proximal and distal ends 105, 106 of the toothbrush body 104, and in some embodiments between neck 110 and the distal end of handle 107 of the toothbrush. If head 108 and neck 110 are integral parts of a user detachable "replacement head" type toothbrush described elsewhere herein, the neck back 260 may preferably be mounted on the distal end of handle 107 rather than the replacement head. The neck band 260 extends circumferentially around the body and has an annular shape. Neck band 260 comprises a plurality of colored arc segments 261 which extend circumferentially around the body 104 of toothbrush 102. Arc segments 261 are therefore each arcuately shaped. At least two different colors are used for arc segments 261 or as many as required by the motion tracking unit 170 for proper tracking of the brushing motions of the toothbrush. If some of the same colors are used on the end cap 221 and neck band 260, like colors are rotationally shifted on the toothbrush body 104 in some embodiments as may be required by motion tracking unit 170 so that the same colors are not axially/longitudinally aligned with each other on the end cap and neck band.

End cap 221 and neck band 260 are configured to not disturb or alter the external profile or contours of the toothbrush body 104 for aesthetic reasons and grip comfort of the user. Accordingly, the end cap and neck band are designed to fit substantially flush with the outer surfaces of the adjoining portions of the toothbrush body such that the outer surfaces of the cap and neck band do not protrude laterally outwards beyond the lateral sides 114 of toothbrush body at the locations where they are disposed. Accordingly, the end cap 221 and neck band 260 form a smooth transition in the longitudinal direction between the adjoining portions toothbrush body 104 and the cap and band which does not alter the profile or contours of the toothbrush body.

The motion tracking colored end cap 221 and/or neck band 260 may be formed as separate components which are fixedly attached to the toothbrush body 104 by any suitable means in some embodiments. In other certain embodiments, the end cap 221 and/or neck band 260 may be integral parts of a monolithic unitary structure of the entire toothbrush body 104, or certain portions arts thereof such as the neck 110 and/or the handle 107 if these components are separate discrete structures coupled together to form the body.

Figure 24:
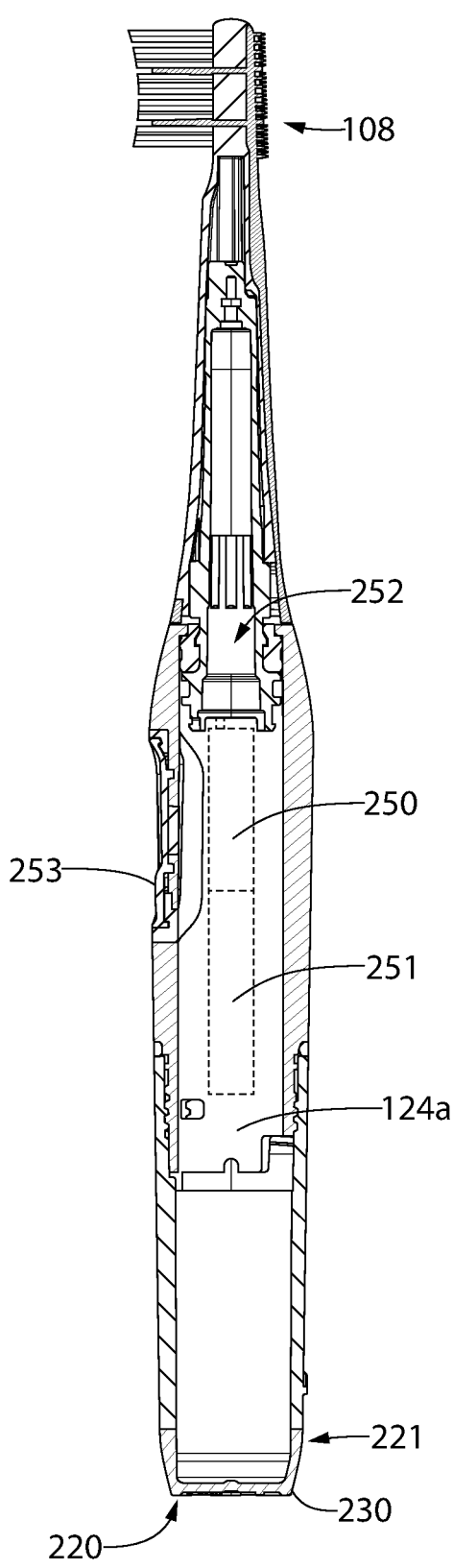
FIG. 24 is a side cross sectional view thereof.

In the present embodiment, toothbrush 102 shown in FIGS. 19-23 may be configured as an electric toothbrush including electric motor 250 operated by a replaceable or rechargeable battery 251 each of which is housed within the interior space 124a of the toothbrush body 104. The motor and battery are shown schematically (in dashed lines) in FIG. 24. Any suitable commercially-available motor and type of battery may be used. A rotary or vibratory drive mechanism 252 operably couples the toothbrush head 108 to motor 250 to impart at least of rotary and/or vibrational motion to the head and tooth cleaning elements 109 thereon. The drive mechanism may be activated via an externally accessible manual actuator switch 253 operably coupled to the motor. In other embodiments, the toothbrush 102 of FIGS. 19-23 may be a manual toothbrush.

In certain embodiments, it bears noting that the previously described visually-detectable colored tracking markers 130, 230, and colored arc segments 261 of neck band 260 may each be of a different color than the outer surface 115 of the body 104 of the toothbrush 102. This assists the motion tracking unit 170 from distinguishing the tracking markers or segments used solely for purposes of motion tracking from the background color of the body of the toothbrush.

As mentioned above, when the multi-colored tracking attachment 120 or the tracking portion 220 and optional neck band 260 if provided are disposed on the oral care implement 101 (e.g., toothbrush 102) and used in conjunction with specifically configured software (control logic/program instructions) executed by the processor 171 of the motion tracking unit 170, these motion tracking features of the oral care implement assists in tracking the movement, position, orientation, location in the oral cavity (i.e., upper left quadrant, upper right quadrant, lower left quadrant, lower right quadrant, etc.) or the like of the oral care implement 101. Specifically, during use of the toothbrush for brushing the teeth, the digital tracking camera 172 of the motion tracking unit 170 is positioned so that the multi-colored tracking attachments or portions and neck band if provided 200 are in the field of view of the camera. The motion tracking unit 170 is able to track the motion, movement, position, orientation, location in the oral cavity, or the like of the oral care implement 101 based on the colors of the colored markers 130, 230 and neck band colored arc segments 261 if provided that the camera 172 perceives and detects. Thus, the colored tracking attachment 120 and tracking portion 220 with and neck band 260 (if provided) works in tandem with a camera, processor, memory, software algorithms to track the motion, movement, position, location, orientation, or the like of the oral care implement 101 during a tooth brushing or oral care session. Although the tracking attachment 120 or tracking portion 220 does not include any electronics or sensors such as accelerometer or gyroscopes in the illustrated embodiments, it could include such components in other embodiments contemplated to aid in tracking motion of the oral care implement in some embodiments contemplated.

While the invention has been described with respect to specific non-limiting examples (e.g., embodiments) including presently preferred modes of carrying out the invention, those skilled in the art will appreciate that there are numerous variations and permutations of the above described systems and techniques which are possible and/or equivalent to those described herein. It is to be understood that other embodiments may be utilized and structural and functional modifications may be made without departing from the scope of the present invention. Thus, the spirit and scope of the invention should be construed broadly as set forth in the appended claims.

What is claimed is:

1. An oral care implement with motion tracking features, the oral care implement comprising:

an elongated body defining a longitudinal axis and comprising a handle defining a proximal end, a head defining a distal end, and a neck connecting the handle to the head; and a tracking attachment coupled to the handle and comprising a plurality of colored tracking markers, the plurality of colored tracking markers configured to facilitate tracking motion of the oral care implement by a user;

wherein the tracking attachment protrudes transversely outwards relative to the longitudinal axis no farther than the handle and includes an outwardly open receiving cavity, and the plurality of colored tracking markers are formed by a set of colored inserts received and mounted in the outwardly open receiving cavity, the colored inserts including at least two different colors;

wherein the outwardly open receiving cavity includes a plurality of axially-extending coupling protrusions, each of the axially-extending coupling protrusions being coupled to one of the colored inserts which retains the respective colored insert in the outwardly open receiving cavity; and wherein each colored insert has an inwardly open engagement recess configured to frictionally engage one of the axially-extending coupling protrusions.

2. The oral care implement according to claim 1, wherein the tracking attachment is insertably received in an outwardly open receptacle formed in the proximal end of the handle.

3. The oral care implement according to claim 1, wherein the outwardly open receiving cavity has a circular shape in transverse cross section.

4. The oral care implement according to claim 1, wherein each of the colored inserts has a wedge shape to form a sector of a circle.

5. The oral care implement according to claim 1, wherein the axially-extending coupling protrusions have a cylindrical shape .

6. The oral care implement according to claim 1, wherein the colored inserts do not project outwards axially beyond the proximal end of the handle of the oral care implement in a longitudinal direction.

7. The oral care implement according to claim 6, wherein the colored inserts are recessed into the proximal end of the handle.

8. The oral care implement according to claim 1, wherein the tracking attachment includes a distally open extension cavity which is in communication with an interior space of the handle of the oral care implement, and wherein the tracking attachment includes a transversely oriented partition wall which separates the outwardly open receiving cavity from the distally-open extension cavity.

9. The oral care implement according to claim 1, wherein the tracking attachment is not spherical in shape.

10. The oral care implement according to claim 1, wherein the axially-extending coupling protrusions have a wedge shape and the inwardly-open engagement recess of the colored inserts have a corresponding wedge shape.

11. A method for assembling an oral care implement with tracking features, the oral care implement comprising:

providing an outwardly open receptacle in the oral care implement; and inserting a tracking attachment into the receptacle, the tracking attachment including an outwardly open receiving cavity; wherein a plurality of colored tracking markers are formed by a set of colored inserts received and mounted in the outwardly open receiving cavity, the colored inserts including at least two different colors; and wherein the outwardly open receiving cavity includes a plurality of axially-extending coupling protrusions, and each of the colored inserts has an inwardly open engagement recess that frictionally engages one of the axially-extending coupling protrusions to retain the respective colored insert in the outwardly open receiving cavity, such that the plurality of colored tracking markers remain visible after the tracking attachment is inserted into the receptacle.

12. An oral care implement with motion tracking features, the oral care implement comprising:

an elongated body defining a longitudinal axis and comprising a handle defining a proximal end, a head defining a distal end, and a neck connecting the handle to the head; and a tracking portion detachably coupled to the handle, the tracking portion comprising a separate end cap coupled to the proximal end of the handle, the tracking portion including a plurality of colored tracking markers, the plurality of colored tracking markers configured to facilitate tracking motion of the oral care implement by a user;

wherein the tracking portion protrudes transversely outwards relative to the longitudinal axis no farther than the handle.

13. The oral care implement according to claim 12, wherein the plurality of colored tracking markers include at least two different colors.

14. The oral care implement according to claim 12, wherein the tracking portion is disposed on the proximal end of the handle.

15. The oral care implement according to claim 12, wherein the plurality of colored tracking markers are formed by a plurality of colored panels disposed on the tracking portion.

16. The oral care implement according to claim 12, wherein the bottom surface of the tracking portion is flat.

17. The oral care implement according to claim 12, wherein the tracking portion has lateral sides which are substantially flush with an outer surface of the proximal end of the handle adjoining the tracking portion.

18. The oral care implement according to claim 12, further comprising a multi-colored neck band disposed between the proximal and distal ends of the body of the oral care implement.

19. The oral care implement according to claim 18, wherein the multi-colored neck band extends circumferentially around the body, wherein the multi-colored neck band comprises a plurality of different color arc segments comprising at least two different colors, wherein the plurality of different color arc segments are arranged such that no arc segment having a certain color is axially aligned with a colored panel on the tracking portion having that same certain color.

\* \* \* \* \*